United States Patent
Yamada et al.

(10) Patent No.: US 7,441,181 B2
(45) Date of Patent: Oct. 21, 2008

(54) AUTOMATIC INFORMATION INPUT PROGRAM

(75) Inventors: Shigefumi Yamada, Kawasaki (JP); Shoji Suzuki, Kawasaki (JP); Takashi Shinzaki, Kawasaki (JP); Takahiro Matsuda, Kawasaki (JP); Jun Ikegami, Kawasaki (JP); Makoto Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 728 days.

(21) Appl. No.: 10/358,253

(22) Filed: Feb. 5, 2003

(65) Prior Publication Data
US 2003/0184589 A1 Oct. 2, 2003

(30) Foreign Application Priority Data
Mar. 29, 2002 (JP) .............................. 2002-096845

(51) Int. Cl.
*G06F 17/00* (2006.01)
(52) U.S. Cl. ........................ 715/226; 715/224
(58) Field of Classification Search ................. 715/507, 715/505, 506, 508, 221–225, 226, 234, 811; 395/147
See application file for complete search history.

(56) References Cited

U.S. PATENT DOCUMENTS

| | | | | |
|---|---|---|---|---|
| 5,495,565 | A * | 2/1996 | Millard et al. .............. | 715/506 |
| 6,192,380 | B1 * | 2/2001 | Light et al. ................. | 715/505 |
| 6,259,447 | B1 | 7/2001 | Kanetake et al. | |
| 6,854,086 | B2 * | 2/2005 | Umen et al. ................. | 715/513 |
| 2002/0023108 | A1 * | 2/2002 | Daswani et al. ............. | 707/507 |
| 2002/0062342 | A1 * | 5/2002 | Sidles ........................ | 709/203 |
| 2002/0103827 | A1 * | 8/2002 | Sesek ......................... | 707/505 |

FOREIGN PATENT DOCUMENTS

| EP | 0 541 236 A1 | 5/1993 |
|---|---|---|
| JP | 11-203243 | 7/1999 |

(Continued)

OTHER PUBLICATIONS

Y. Tang et al., "Information Acquisition and Storage of Forms in Document Processing"; Proceedings of the 4th International Conference on Document Analysis and Recognition (ICDAR); IEEE Computer Scoiety; 1997; vol. II; pp. 170-174.

(Continued)

*Primary Examiner*—Stephen Hong
*Assistant Examiner*—Manglesh M Patel
(74) *Attorney, Agent, or Firm*—Staas & Halsey LLP

(57) ABSTRACT

When predetermined information is input into an input field and an OK button is pressed on a user authentication screen displayed on a monitor screen by a browser at entry time, the input predetermined information, the input predetermined information, the positional information about the input field and the OK button, and the identification information on the user authentication screen are obtained by the input unit and entered in an external storage device through a storage unit. When the authentication screen detection unit detects the user authentication screen by the authentication screen detection unit at input time, the input/press unit automatically inputs the predetermined information read from the external storage device into the position of the input field obtained according to the positional information read from the external storage device through the storage unit, and the position of the OK button is automatically pressed.

41 Claims, 18 Drawing Sheets

FOREIGN PATENT DOCUMENTS

WO        WO 01/75779 A1    10/2001

OTHER PUBLICATIONS

"Roboform®: User Manual"; Siber Systems; Dec. 2001, pp. 1-19.

European Search Report for European Application No. EP 03 25 1143; mailed Mar. 17, 2006.

European Office Action issued Dec. 13, 2006 in corresponding European Patent Application No. 03 251 143.8 (9 pages).

Japanese Patent Office Action, mailed Oct. 2, 2007 and issued in corresponding Japanese Patent Application No. 2002-096845 (3 pages, English translation—3 pages).

* cited by examiner

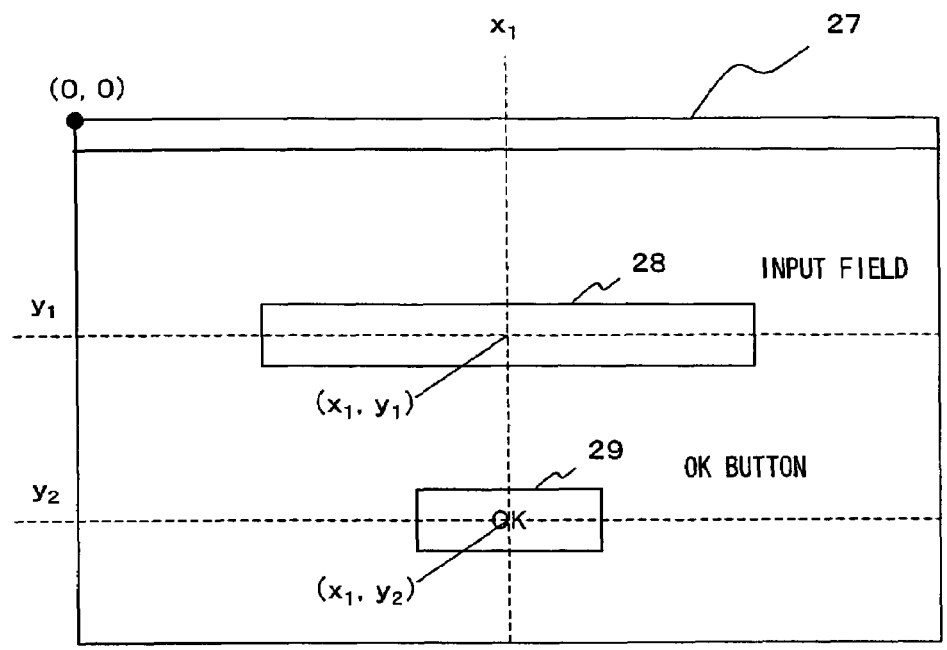
F I G. 5 A
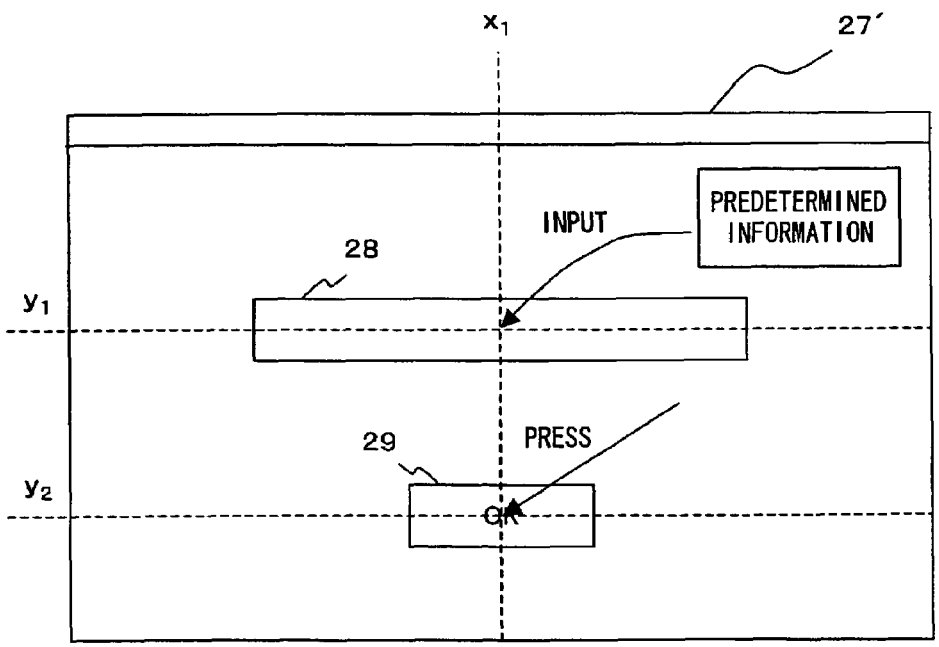
F I G. 5 B

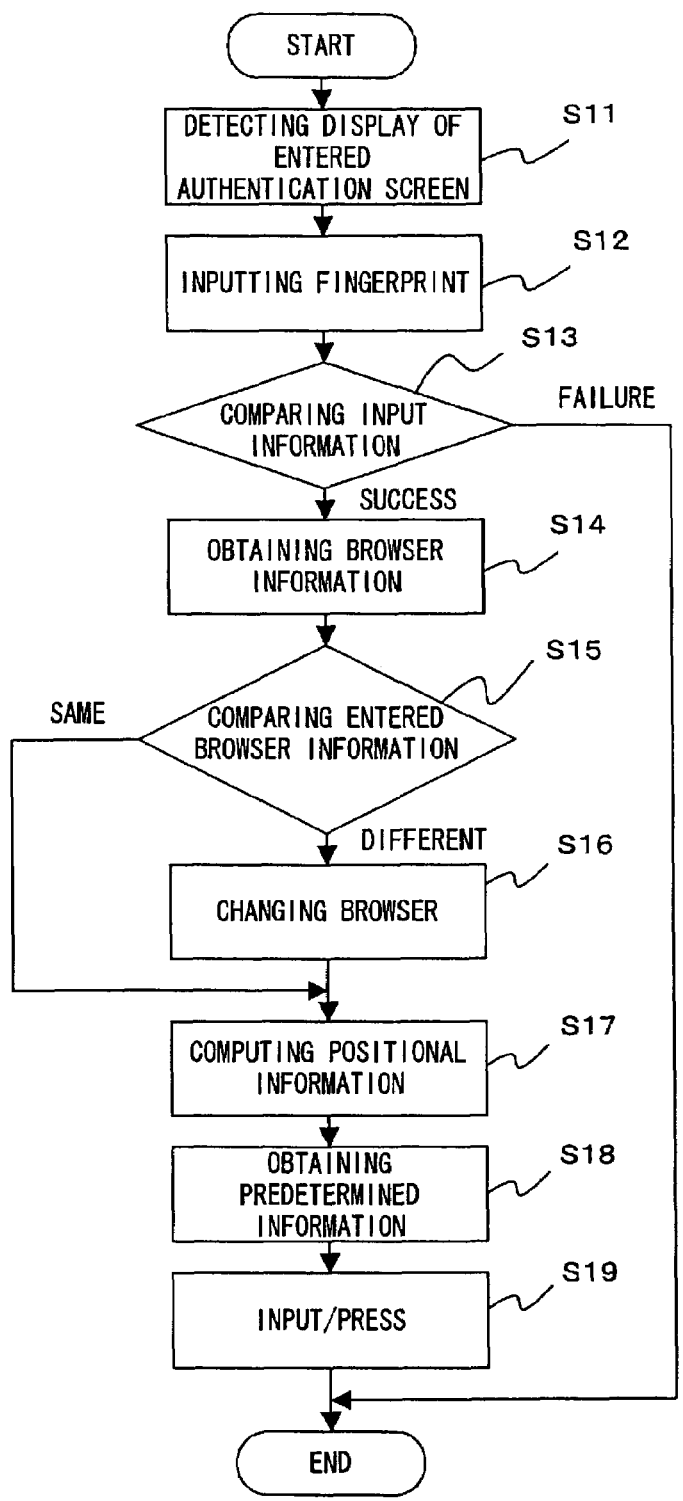
F I G. 7

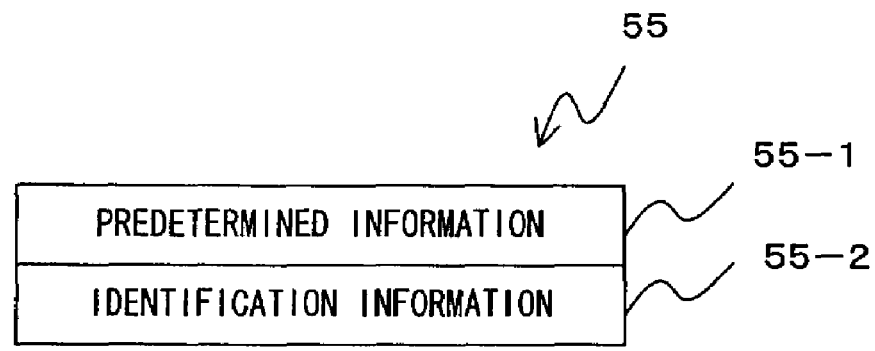
F I G. 1 3 A
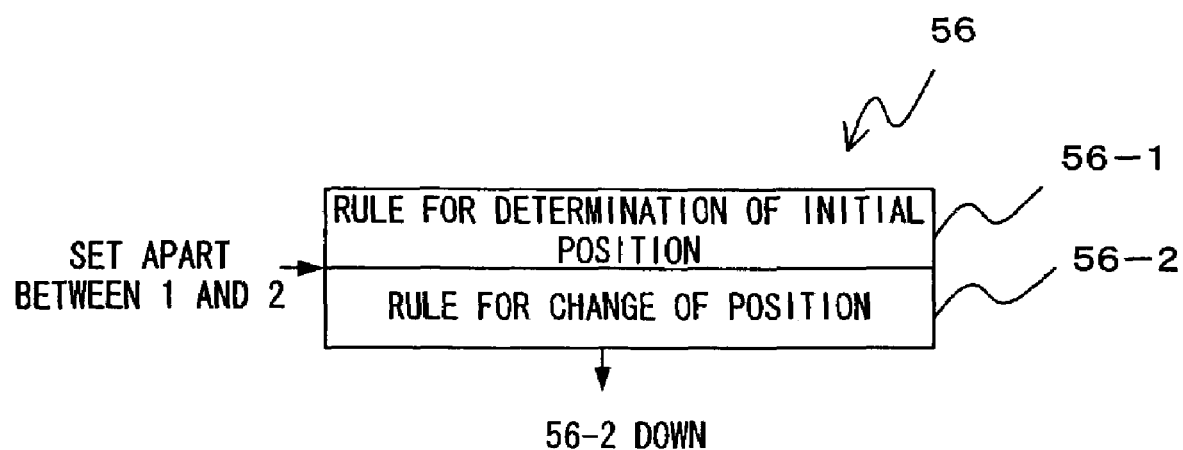
F I G. 1 3 B

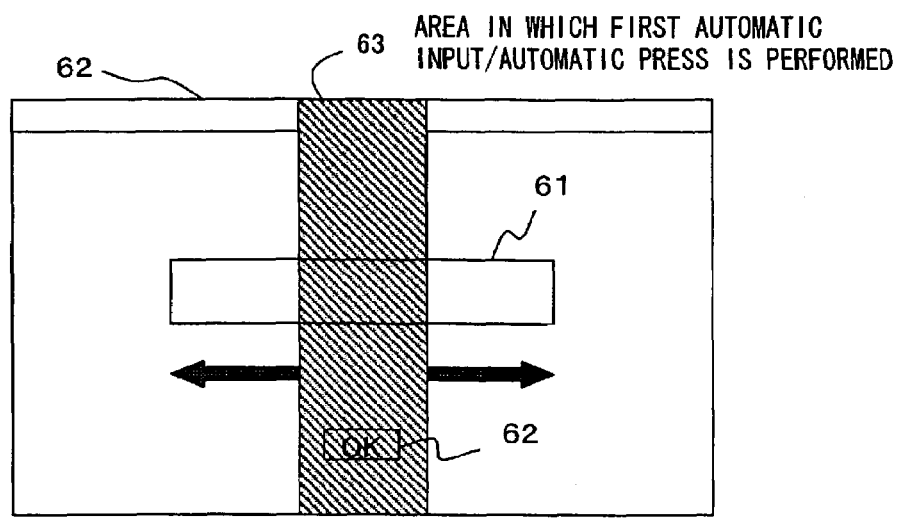
FROM CENTER TO LEFT AND RIGHT
F I G. 1 8 A
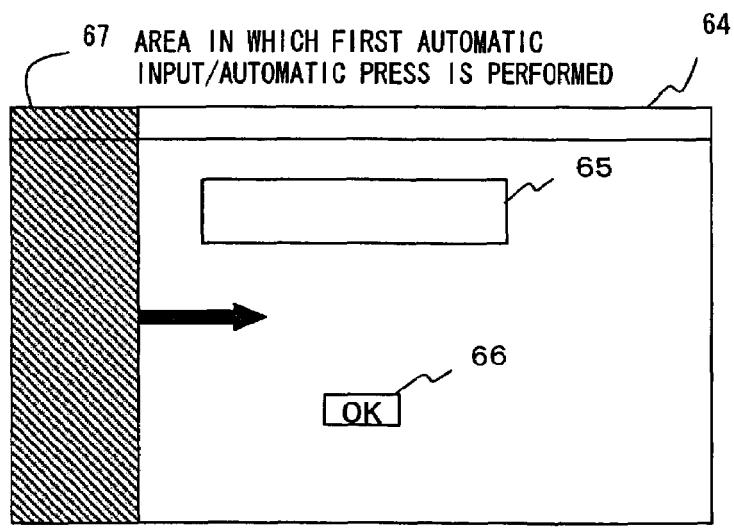
FROM LEFT TO RIGHT
F I G. 1 8 B

AUTOMATIC INFORMATION INPUT PROGRAM

BACKGROUND OF THE INVENTION

1. Field of the Invention

The present invention relates to an automatic information input program for automatically specifying the position of an input or a press to realize an automatic input or an automatic press for use with a system of automatically inputting an ID and a password on a user authentication screen after user authentication, and then automatically pressing an OK button for confirmation of the input contents.

2. Description of the Related Art

With recent vigorous computerization, various types of application software (hereinafter referred to simply as an application) for electronic mail, groupware, etc. have appeared. The applications require user authentication, and prompt a user an inputting operation with an ID, a password, etc.

Normally, there are various types of applications used by a user. Therefore, the user has the heavier load of managing an ID and a password (hereinafter referred to simply as a password). Accordingly, to simplify the management of the password by the user, it has been suggested that the user authentication in all applications should be performed by only one authenticating process.

In the suggestion, the technology of monitoring a displayed user authentication screen on a computer screen, prompting the user biometric information such as a fingerprint, etc. or a password when the user authentication screen is displayed, and, when user authentication is obtained by the prompt, performing an automatic input of a password on the user authentication screen by other applications displayed on the computer screen, and an automatic press of an OK button for confirmation of the input contents is suggested.

As an example of a conventional suggestion, normally a control ID is assigned to the control (an input field, button, etc.) forming a user authentication screen, and the control ID is assumed to uniquely correspond to the control on the screen of an application.

That is, according to a conventional technology 1, the above mentioned control ID is obtained, the obtained control ID and a password are entered in the storage device on the user side in advance, an input field into which a password is to be input, and an OK button to be pressed are specified from the entered control ID when the display of the user authentication screen is detected on the computer screen, and the password is automatically input and the OK button is automatically pressed in the positions of the specified input field and the OK button.

Thus, in the Windows (registered trademark) application having a user authentication screen, the Web application in which an authentication dialog box is activated as another screen by the browser, etc. such as mail software, a common job application, etc., a password can be automatically input and an OK button can be automatically pressed when a control ID can be uniquely obtained from an input field and an OK button.

Furthermore, as another example of a conventional technology, when an input field and an OK button are embedded in the window area on the monitor screen as a user authentication screen (embedded authentication screen) in a Web application, normally a file generated in a markup language such as an HTML and an XML is assumed to be used to display a user authentication screen.

A markup language is described in text, and the description is formed by tags (a start tag and an end tag are referred to simply as tags) and text character strings enclosed between a start tag and an end tag. The start tag contains various display specification information, and the types of tags cover a broad spectrum. The description of the above mentioned input field and OK button are enclosed by specific start end tags.

According to the above mentioned conventional technology 2, the tag information (the information such as the tags and the text character string between the start tag and the end tag, etc.) is entered in advance, and the positions of the input field to be input and the OK button to be pressed are specified according to the entered tag information, thereby automatically inputting a password and pressing an OK button.

However, the method of detecting the positions of an input field and an OK button on the screen according to the control ID of the above mentioned conventional technology 1 is applied to a browser, etc. in which an input field and an OK button uniquely correspond to a control ID, and cannot be applied to other browsers.

A browser normally indicates software for sequentially viewing the contents of a data file, and currently refers to a Web browser for viewing a file and data described in a markup language through Internet. Typical examples of a Web browser are Internet Explorer (IE) and Netscape Navigator (NN).

Not only in these IE and NN, but also in common mail software, etc., when a user specifies an input password to be stored, the password is automatically input next time and afterwards. Therefore, it is not necessary to consider an automatic input of the password. However, the stored password is stored in a file predetermined in an IE, NN, or mail software, etc. is a general purpose application because it is common among many and unspecified user rather than in application purposes. Therefore, a number of users are familiar with the system, and these users can easily know the stored passwords although the stored passwords are other users passwords.

Therefore, in the case of an IE, NN, mail software, etc., regardless of the automatic storage capability, a user has to store a password using a unique application so that the password can be automatically input.

However, in the case of the conventional technology 1, when the Web browser is an IE, the control ID is not individually associated with an input field and an OK button in the IE specifications, but is associated with an authentication dialog box indicating an input field and an OK button. Therefore, although the position of the authentication dialog box on the window can be obtained by the control ID, the positions of the input field and the OK button cannot be obtained.

Furthermore, when a Web browser is an NN, the positions of the input field and the OK button can be obtained on the window using a control ID. However, in the specifications of the NN, each time the display of the Web page and the authentication screen changes, a control ID is newly assigned to the display page.

Therefore, although the control ID is obtained at first authentication entry time, and the control ID is entered in advance, the control ID changes each time the authentication screen is displayed as described above. Therefore, the input field and the OK button cannot be specified from the control ID entered on the user side.

The method of specifying the positions of the input field and the OK button according to the tag information about the input field and the OK button of the markup language in the above mentioned conventional technology 2 can be used without any trouble if the markup language is described in a basic format. However, special descriptions have been added in many cases by, for example, applying images such as Jpeg, etc. instead of the text character strings of 'OK' to the tags of OK buttons. In these cases, it is often hard to obtain the positions of an input field and an OK button according to tag information.

Especially, in the recent Web applications, there are an increasing number of embedded authentication screens in a file written in a markup language. With the increasing number of Web applications, the standard of the markup language is updated, with various tag descriptions developed and used. In this situation, it is predicted that the number of Web applications inapplicable to the method of obtaining the positions of an input field and an OK button will increase.

SUMMARY OF THE INVENTION

The present invention has been developed to solve the above mentioned problem, and aims at providing an automatic information input program for automatically inputting predetermined information and automatically pressing an OK button by specifying the positions of an input field and an OK button independent of an input information storing method specific to a general purpose application, a control ID, tag information, etc.

To attain the above mentioned object, the program according to the present invention is configured as follows.

According to an aspect of the first embodiment of the present invention, an automatic information input program for directing a computer to perform a process of automatically inputting predetermined information into an input field on an input window for input of predetermined information on the input window displayed on the monitor screen in an application is configured such that the computer can perform: at entry time an information entering process of entering the predetermined information, and an input position entering process of entering the positional information about the input field on the input window displayed on the monitor screen; and at input time an input position detecting process of detecting the potion of the input field on the input window displayed on the monitor screen according to the positional information entered in the input position entering process, and an information input process of automatically inputting the predetermined information entered in the information entering process into the input field detected in the input position detecting process.

The program can be configured such that, for example, the computer can further perform: at entry time a button position entering process of entering the positional information of a button displayed corresponding to the input field on the monitor screen; and at input time a button position specifying process of specifying the position of the button according to the positional information entered in the button position entering process, and a pressing process of automatically pressing the button in the position specified in the button position specifying process.

Furthermore, the program is configured such that, for example, the computer can perform: at entry time an identification information obtaining process of obtaining the identification information for specification of the application displaying the input field from the application, and an identification information entering process of entering the identification information obtained in the identification information obtaining process; and at input time a display detecting process of monitoring the screen displayed on the monitor screen and detecting that a screen is displayed by the application holding the identification information entered in the identification information entering process.

The program is also configured such that, for example, the computer can perform: an entering process of entering as the position of the input field the position specified by a pointing device as an input position in the input position entering process, and an entering process of entering as the position of the button the position pressed by the pointing device in the button position entering process.

Additionally, the program is configured such that, for example, the computer can perform: at entry time a size entering process of entering the size information about the screen displayed on the monitor screen; and at input time a screen size changing process of automatically changing the size of the screen being displayed into the size at size entry time according to the size information about the screen entered in the size entering process when the size of the screen being displayed on the monitor screen is different from the size at size entry time of the screen. In this case, the program is configured, for example, such that the computer can further perform a screen size restoring process of restoring the size of the screen whose size has been changed in the screen size changing process into the originally displayed screen size after automatically inputting the predetermined information or automatically pressing the button.

Furthermore, the program is configured such that, for example, the computer can perform: at entry time a font information entering process of entering the size information and the type information about a character font used on the window of the monitor screen; and at input time a font changing process of changing the size or type of the font used on the screen being displayed into the size or type of the entered font when the size or type of the font used on the screen being displayed on the monitor screen is different from the size or type of the font at entry time. In this case, the program is configured such that, for example, the computer can further perform a font restoring process of restoring the size or type of a font on the screen changed in the font changing process into the size or type of the font on the originally displayed screen after an automatic input of the predetermined information or an automatic press of the button.

The program can also be configured such that, for example, the computer can perform: at entry time an application information obtaining process of obtaining the information about the type or version of the application displaying on the screen the input field or the button for the position of the input field or the button displayed on the monitor screen, and an application information entering process of entering the information about the type or version of the according to obtained in the application information obtaining process with the information associated with the positional information about the input field or the button; and at input time a position computing process of computing the position of the input field or the button displayed on the monitor screen in the application of a different type or version according to the difference information entered in advance for the difference on the screen display between the types or versions of the applications when the type or version of the application displaying the input field or button on the monitor screen is different from the type or version of the application displaying the button.

The program can also be configured such that, for example, the computer can perform: at entry time another display presence/absence entering process of entering the presence/absence of another display as to whether or not there is a display of a button indicating the function specific to an application or a display of a small window belonging to an application for the position of the input field or button displayed on the monitor screen, and another display difference information entering process of entering the difference information corresponding to the presence/absence of another display for the position on the input field or button on the monitor screen; and at input time a position computing process of computing the display position of the input field or the button being displayed in the application according to the difference information entered in the other display difference information entering process when the presence/absence of the other display in the application displaying the input field or button on the monitor screen is different from the presence/absence of the other display entered at entry time.

The program can be configured such that, for example, the computer can perform at input time: an input success/failure detecting process of detecting whether or not an automatic input of the predetermined information into the input field or an automatic press of the button has been successfully performed; a search area setting process of setting a predetermined search area on the monitor screen when a failure has been detected in the input success/failure detecting process; a trial process of automatically inputting the predetermined information or automatically pressing the button by moving a position in the search area set in the search area setting process; and a trial frequency control process of performing control such that the movement of the position in the search area and the automatic input of the predetermined information or the automatic press of the button are tries until a predetermined result can be obtained if the automatic input of the predetermined information or the automatic press of the button has failed in the trial process.

The program is configured such that, for example, the computer can further perform: at input time a rule entering process of entering a predetermined rule specifying a different search area; and a repeating process of repeating the trial process under the control of the trial frequency control process while moving the position from a reference position specified according to the rule entered in the rule entering process if the automatic input of the predetermined information into the input field or the automatic press of the button has failed in the trial process under the trial frequency control process in the search area set in the search area setting process.

According to an aspect of the second embodiment of the program of the present invention, an automatic information input program for directing a computer to perform a process of automatically inputting information about an information input field displayed on the monitor screen of an application is configured such that the computer can perform: an initial position determining process of determining the initial position into which the information is to be automatically input in a predetermined search area on the screen displayed on the monitor screen; a next position determining process of sequentially moving the next automatic input position to a different position at a predetermined rule based on an initial position determined in the initial position determining process; an input process of automatically inputting the information in a position determined in the initial position determining process or the next position determining process; an input success/failure detecting process of detecting whether or not information has been successfully input into the information input field by an automatic information input in the input process; and a control process of controlling each of the above mentioned processes such that when a failure is detected in the input success/failure detecting process on the automatic information input performed by the input process on the position determined in the initial position determining process, the next position determining process determines the next position, the input process automatically inputs the information in the position, the input success/failure detecting process detects the success/failure of the input for the automatic information input, the next position determining process determines again the next position when a failure is detected in the detecting process, the input process automatically inputs the information in the position, and the input success/failure detecting process detects the success/failure of an input on the automatic information input until a predetermined input result can be obtained. In this case, the program is configured such that the computer can perform if information is automatically input: an input information entering process of entering the information in advance; and the information input process of inputting the information entered in advance at automatic input time of the information.

According to an aspect of the third embodiment of the program of the present invention, an automatic information input program for directing a computer to perform a process of automatically pressing a push button displayed on the monitor screen of an application is configured such that the computer can perform: an initial position determining process of determining the initial position in which the push button is to be automatically pressed in a predetermined search area on the screen displayed on the monitor screen; a next position determining process of sequentially moving the next automatic press position to a different position at a predetermined rule based on an initial position determined in the initial position determining process; a pressing process of automatically pressing a push button in a position determined in the initial position determining process or the next position determining process; a press success/failure detecting process of detecting whether or not the push button has been successfully pressed by an automatic press in the pressing process; and a control process of controlling each of the above mentioned processes such that when a failure is detected in the successful/faulty press detecting process on the automatic press performed by the pressing process on the position determined in the initial position determining process, the next position determining process determines the next position, the pressing process automatically presses the push button in the position, the input success/failure detecting process detects the success/failure of the press for the automatic press, the next position determining process determines again the next position when a failure is detected in the detecting process, the pressing process automatically presses the push button in the position, and the input success/failure detecting process detects the success/failure of a press on the automatic press until a predetermined press result can be obtained.

According to an aspect of the second and third embodiments, the program is configured such that, for example, the computer can further perform: the identification information entering process of obtaining in advance identification information specifying the application for displaying the input field into which the predetermined information entered in advance from the application, and entering in advance the obtained identification information; and the display detecting process of monitoring the screen displayed on the monitor screen, and detecting a display on the screen by the application having the identification information entered in the identification information entering process.

According to an aspect of the second and third embodiments, the program is configured such that, for example, the computer can further perform an initial position determination rule entering process of entering a first rule for determination of the initial input position in the initial input position determining process or a second rule for determination of the initial press position in the initial press position determining process, with the initial input position determining process performed such that the initial input position can be determined according to the first rule entered in the initial position determination rule entering process, or with the initial press position determining process performed such that the initial press position can be determined according to the second rule entered in the initial position determination rule entering process.

Furthermore, according to an aspect of the second and third embodiments, the program is configured such that, for example, the computer can further perform a next position determination rule entering process of entering a third rule for determination of the next input position in a next input position determining process or the fourth rule for determination of the next press position in a next press position determining process, with the next input position determining process performed such that the next input position can be determined according to the third rule entered in the next position determination rule entering process, and the next press position determining process performed such that the next press position can be determined according to the fourth rule entered in the next position determination rule entering process.

Additionally, according to an aspect of the first, second, and third embodiments, the program is configured such that, for example, the computer can perform: a file information entering process of entering in advance the file information about the markup language for generation of the window as the identification information for designation of a window on the monitor screen for display of the input field; a file information obtaining process of obtaining the file information about the window displayed on the monitor screen at input time; a comparing process of comparing the file information obtained in the file information obtaining process with the file information entered in the file information entering process; and an execution control process of controlling the predetermined information to be automatically input or the button to be automatically pressed on the window when the file information match in the comparing process.

According to an aspect of the first, second, and third embodiments, the program is configured such that, for example, the computer can perform: an additional information adding process of adding predetermined additional information in a predetermined description position in a file described in the markup language on the screen displaying the input field or the button on the monitor screen; a discriminating process of discriminating whether or not predetermined additional information is additionally described in a predetermined description position in a markup language on the window displayed on the monitor screen at input time; and an execution control process of controlling the predetermined information to be automatically input or the button to be automatically pressed on the window when predetermined additional information is discriminated in the discriminating process.

Additionally, according to an aspect of the first and second embodiments, the program is configured such that, for example, the computer can perform: a process of automatically inputting into the input field an ID or a password, or both of them as the predetermined information.

According to an aspect of the first and second embodiments, the program is configured such that, for example, the computer can perform: the initial position determining process of setting the top end of a predetermined display area on the monitor screen as an initial position into which the predetermined information is automatically input; the next position determining process of moving a next input position sequentially downwards using the initial position determined in the initial position determining process as a reference; the input process of sequentially and automatically inputting an ID and a password into the two positions determined in the initial position determining process or the next position determining process; an input success/failure detecting process of detecting whether or not the IE or a password has been successfully input into the input field by automatic information input in the input process; and a control process of controlling each of the above mentioned processes such that when a failure is detected in the input success/failure detecting process on the automatic input performed by the input process on the position determined in the initial position determining process, the next position determining process determines the next position, the input process automatically inputs the information in the position, the input success/failure detecting process detects the success/failure of the input for the automatic input, the next position determining process determines again the next position when a failure is detected in the detecting process, the input process automatically inputs the information in the position, and the input success/failure detecting process detects the success/failure of an input on the automatic input until a predetermined input result can be obtained.

According to an aspect of the first and second embodiments, the program is configured such that, for example, the window on the monitor screen can be a window of the Web page relating to an electronic transaction, and the predetermined information can be necessary information for purchase of merchandise in the electronic transaction.

According to an aspect of the first, second, and third embodiments, the program is configured such that, for example, the input field can be an information input field of a Web page, an information input field of mail software, or a dialog box activated as another screen by a browser, or a similar information input field.

Furthermore, according to the first and second embodiments, the program can be configured such that, for example, the application with the input field cannot be changed.

Described below is the configuration of the automatic information input method according to the present invention.

According to the first embodiment of the automatic information input method of the present invention, an automatic information input method for automatically inputting predetermined information into an input field and automatically pressing a button on a window for display of the input field and the button corresponding to the input field on the monitor screen of an application is configured to include: at entry time, an information entering step of entering the predetermined information; an input position entering step of entering the positional information about the input field on the window displayed on the monitor screen; a button position entering step of entering the positional information about the button on the window displayed on the monitor screen; an identification information obtaining step of obtaining from the application the identification information specifying the application for displaying the input field and the button; and an identification information entering step of entering the identification information obtained in the identification information obtaining step; and at input time, a display detecting step of monitoring the screen displayed on the monitor screen and detecting that screen display is performed by the application having the identification information entered in the identification information entering step; an input position detecting step of detecting the position of the input field on the monitor screen according to the positional information entered in the input position entering step; an information input step of automatically inputting the predetermined information entered in the information entering step in the input field detected in the input position detecting step; a button position specifying step of specifying the position of the button on the monitor screen according to the positional information entered in the button position entering step; and a pressing step of automatically pressing the button in the position specified in the button position specifying step.

According to the second embodiment of the automatic information input method of the present invention, an automatic information input method for automatically inputting predetermined information into an input field and automatically pressing a button on a window for display of the input field and the button corresponding to the input field on the monitor screen of an application is configured to include: an input position entering step of entering in advance the predetermined information; an identification information entering step of obtaining in advance from the application the identification information specifying the application for displaying the input field and the button, and entering in advance the obtained identification information; a display detecting step of monitoring the screen displayed on the monitor screen, and detecting that screen display is performed by the application having the identification information entered in the identification information entering step; an initial position determining step of setting a predetermined position on the input window displayed on the monitor screen; a next press position determining step of sequentially moving the next input position using the initial position determined in the initial position determining step as reference according to a predetermined rule; an inputting/pressing step of sequentially and automatically inputting the predetermined information and automatically pressing the button in the two positions determined in the initial position determining step or the next position determining step; an successful/faulty input/press detecting step of detecting whether or not the automatic input or the automatic press in the inputting/pressing step has been successful; and a step of repeating, when the successful/faulty input/press detecting step detects a failure in the automatic input or automatic press performed in the inputting/pressing step on the position determined in the initial position determining step, the next position determining step determining the next position, the inputting/pressing step performing the automatic input or automatic press on the position, and the successful/faulty input/press detecting step detecting the success/failure of input/press on the automatic input or the automatic press; and, when a failure is detected in the detecting step, the next position determining step determining the next position again, the inputting/pressing step performing the automatic input or press on the position, the successful/faulty input/press detecting step detecting the success/failure of the input/press on the automatic input or press.

According to the first embodiment of the automatic information input apparatus of the present invention, an automatic information input apparatus for automatically inputting predetermined information into an input field and automatically pressing a button on a window for display of the input field and the button corresponding to the input field on the monitor screen of an application is configured to include: at entry time, an information entry unit for entering the predetermined information; an input position entry unit for entering the positional information about the input field on the window displayed on the monitor screen; a button position entry unit for entering the positional information about the button on the window displayed on the monitor screen; an identification information obtaining unit for obtaining from the application the identification information specifying the application for displaying the input field and the button; and an identification information entry unit for entering the identification information obtained in the identification information obtaining unit; and at input time, a display detection unit for monitoring the screen displayed on the monitor screen and detecting that screen display is performed by the application having the identification information entered in the identification information entry unit; an input position detection unit for detecting the position of the input field on the monitor screen according to the positional information entered in the input position entry unit; an information input unit for automatically inputting the predetermined information entered in the information entry unit in the input field detected by the input position detection unit; a button position specification unit for specifying the position of the button on the monitor screen according to the positional information entered in the button position entry unit; and a pressing unit for automatically pressing the button in the position specified in the button position specification unit.

According to the second embodiment of the automatic information input apparatus of the present invention, an automatic information input apparatus for automatically inputting predetermined information into an input field and automatically pressing a button on a window for display of the input field and the button corresponding to the input field on the monitor screen of an application is configured to include: an input position entry unit for entering in advance the predetermined information; an identification information entry unit for obtaining in advance from the application the identification information specifying the application for displaying the input field and the button, and entering in advance the obtained identification information; a display detection unit for monitoring the screen displayed on the monitor screen, and detecting that screen display is performed by the application having the identification information entered in the identification information entry unit; an initial position determination unit for setting a predetermined position on the input window displayed on the monitor screen; a next press position determination unit for sequentially moving the next input position using the initial position determined by the initial position determination unit as reference according to a predetermined rule; an input/press unit for sequentially and automatically inputting the predetermined information and automatically pressing the button in the two positions determined by the initial position determination unit or the next position determination unit; an successful/faulty input/press detection unit for detecting whether or not the automatic input or the automatic press by the input/press unit has been successful; and a unit for repeating, when the successful/faulty input/press detection unit detects a failure in the automatic input or automatic press performed by the input/press unit on the position determined by the initial position determination unit, the next position determination unit determining the next position, the input/press unit performing the automatic input or automatic press on the position, and the successful/faulty input/press detection unit detecting the success/failure of input/press on the automatic input or the automatic press; and, when a failure is detected by the detection unit, the next position determination unit determining the next position again, the input/press unit performing the automatic input or press on the position, the successful/faulty input/press detection unit detecting the success/failure of the input/press on the automatic input or press.

Thus, according to the present invention, predetermined information can be automatically input and an OK button can be automatically pressed with an input field of the predetermined information and the position of the OK button specified independent of the method of storing input information specific to a general-purpose application, a control ID, tag information, etc. Therefore, frequently called specific information on the same screen can be automatically input and confirmed, thereby omitting inputting operations for specific information with high security in various fields successfully maintained when performing log-in to mail software, Windows (registered trademark), release of a lock to a screen saver, password input when a network connection is made, authentication on the dial, a password lock to an MS OFFICE (registered trademark), access to the home page exclusive to members, etc., and greatly lowering the load to users.

BRIEF DESCRIPTION OF THE DRAWINGS

FIG. 5A shows a type of authentication screen at entry time displayed on the screen of the display device in the basic process; and FIG. 5B shows a type of authentication screen at input time;

FIG. 7 is a flowchart of the process at input time somewhat different from the processes shown in FIGS. 4 and 5B;

FIG. 13A shows the configuration of the database stored in the external storage device at entry time according to the second embodiment.

FIG. 18A shows a type of the state of changing the input position on the window according to the second rule; and FIG. 18B shows a type of the state of changing the input position on the window according to the third rule.

DESCRIPTION OF THE PREFERRED EMBODIMENTS

The embodiments of the present invention are described below by referring to the attached drawings. In the following explanation, an information input dialog box screen is representatively referred to as a user authentication screen.

Figure 1:
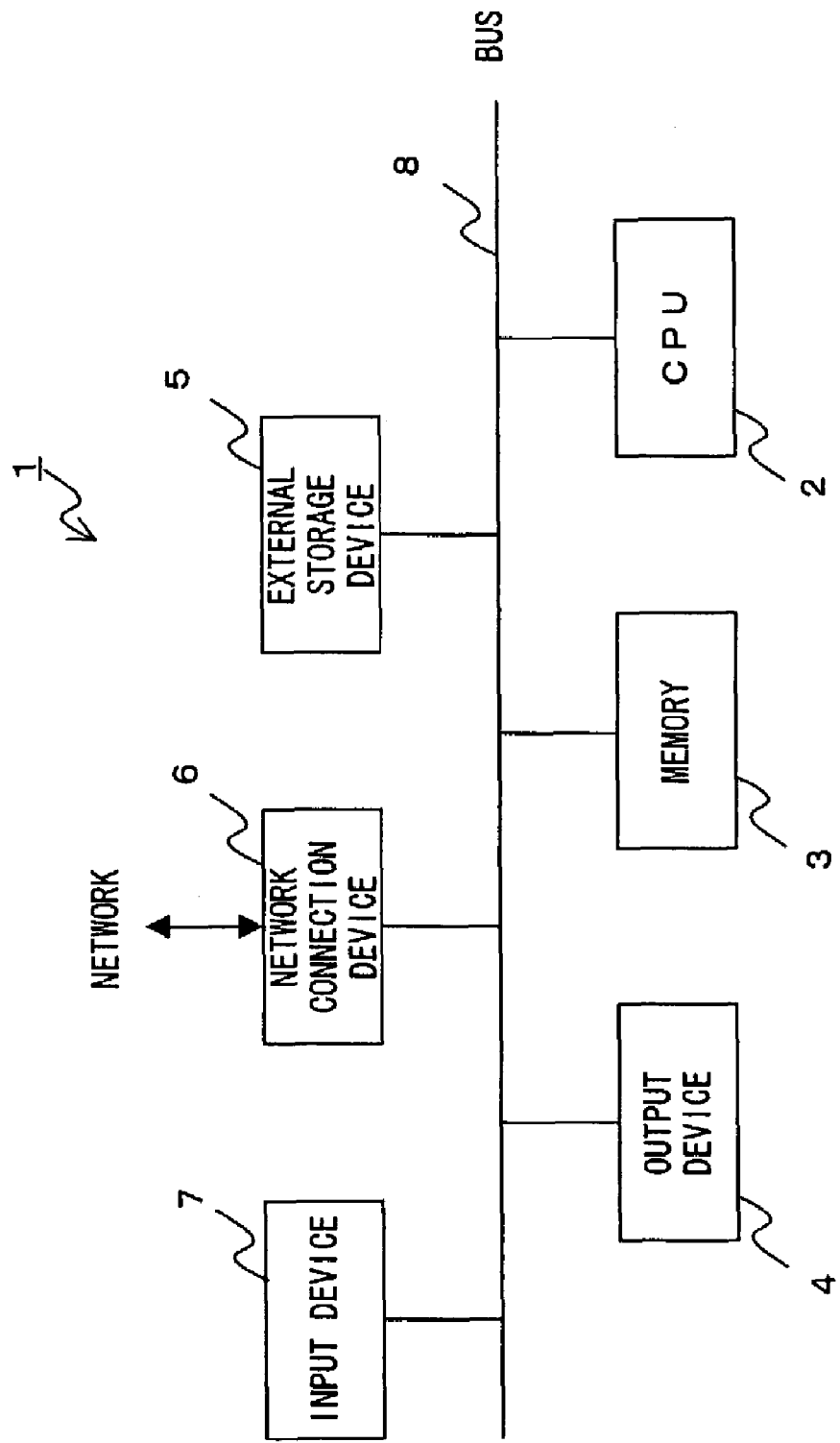
FIG. 1 is a block diagram of the hardware configuration of a computer for performing the process by an automatic information input program according to the present invention.

FIG. 1 is a block diagram of the hardware configuration of a computer for performing the process by an automatic information input program according to the present invention. A computer 1 according to the present embodiment shown in FIG. 1 comprises a CPU (central processing unit) 2, memory 3, an output device 4, an external storage device 5, a network connection device 6, and an input device 7. These components are interconnected through a bus 8.

The CPU 2 contains, for example, ROM (read only memory), RAM (random access memory), etc. and stores a program and data to be used in a process. The computer 1 performs a necessary process by executing the program using the memory 3.

That is, a Web browser loaded into, for example, the external storage device 5 is read to the memory 3, retrieves and obtains a file and data of the service device connected to a network through the network connection device 6, and displays the obtained file contents and data contents on the display device.

The process of automatically inputting necessary information into an input field of, for example, a user authentication screen, etc. displayed on the window of the display device of the client device and automatically pressing an OK button corresponding to the input field by the above mentioned Web browser and another application (hereinafter referred to simply as an application) according to the present invention is performed by the automatic information input program stored in the memory 3.

The output device 4 has a monitor screen of a display, etc., and a user performs an input information entering operation, etc. using the input device 7 such as a mouse, a keyboard, etc. while viewing the window displayed on the monitor screen by a desired application.

The external storage device 5 can be, for example, a magnetic disk device, an optical disk device, a magneto-optical disk device, etc. The computer 1 stores the above mentioned various applications, the automatic information input program, data, etc. according to the present invention, and can use them by loading them into the memory 3.

The network connection device 6 relays the communications with an external server device through a LAN (local area network) and an optional network (circuit) such as Internet, etc.

With the above mentioned configuration of the computer 1, a process of a system in which predetermined information entered in advance is automatically input in the input field on the embedded authentication screen after authentication of a user using, for example, a fingerprint, etc. is performed is explained below as a first embodiment.

The personal authentication is not limited to a fingerprint, but can be performed using other biometric information, for example, an operation specific to a living object or the property unique to a person such as a voice print, an iris, a retina, a face, a signature, a stroke, etc.

The present embodiment relates to a process of automatically inputting predetermined input information on various information input windows displayed on the monitor screen of the output device 4 of the computer 1 after obtaining the permission to operate the computer 1 according to the above mentioned personal authentication, and automatically pressing an OK button for confirmation of the automatic input.

Figure 2:
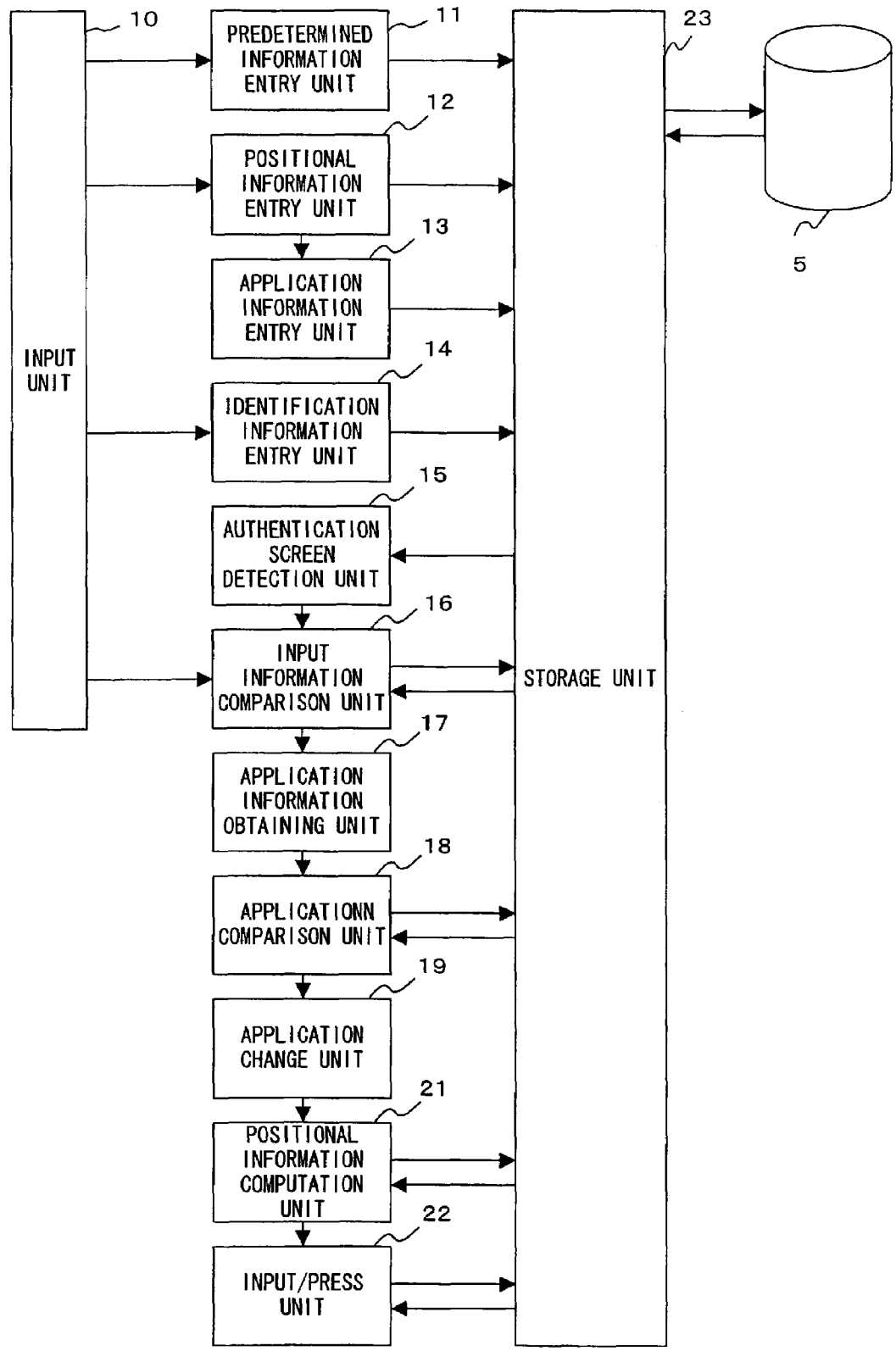
FIG. 2 is a block diagram of a process function module according to the first embodiment of the process performed by the automatic information input program executed by the CPR of the computer.

FIG. 2 is a block diagram of a process function module according to the first embodiment of the process performed by the automatic information input program read by the external storage device 5 of the computer 1 to the memory 3, and executed by the CPU 2.

As shown in FIG. 2, the process function module comprises an input unit 10, a predetermined information entry unit 11, a positional information entry unit 12, an application information entry unit 13, an identification information entry unit 14, an authentication screen detection unit 15, an input information comparison unit 16, an application information obtaining unit 17, an application comparison unit 18, an application change unit 19, a positional information computation unit 21, an input/press unit 22, and a storage unit 23. The storage unit 23 is linked to the external storage device 5 shown in FIG. 1.

Figure 3A:
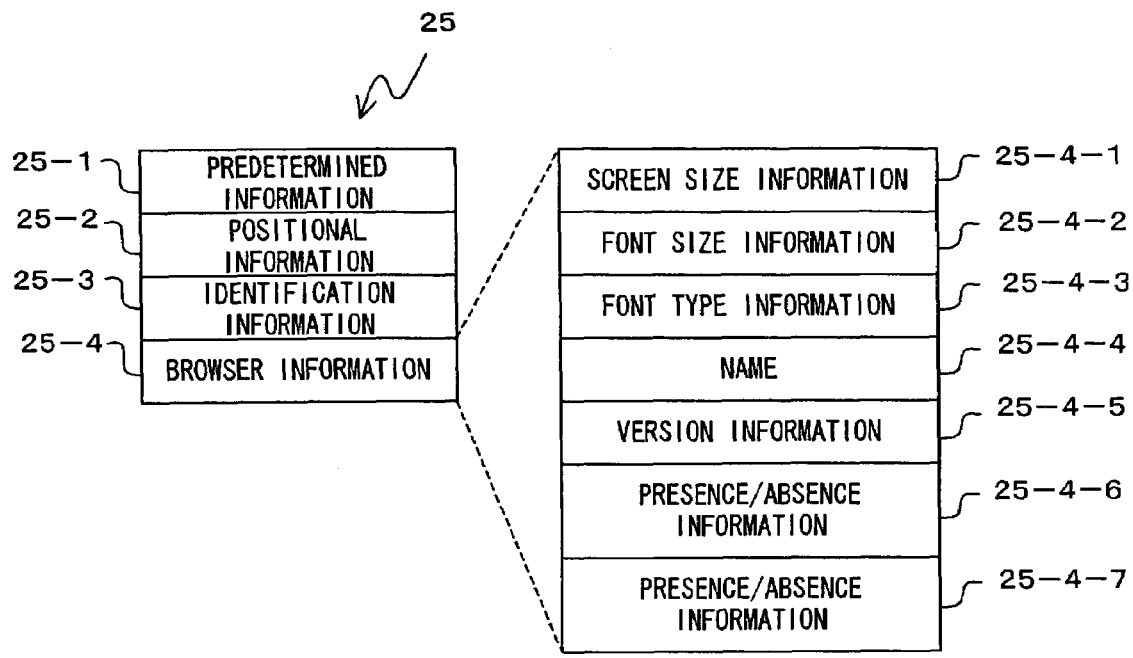
FIG. 3A shows the configuration of the database stored in the external storage device at entry time according to the first embodiment.
Figure 3B:
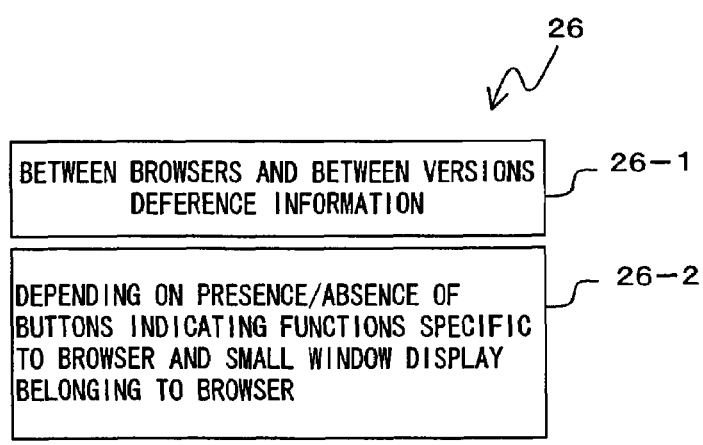
FIG. 3B shows the configuration of the database stored in advance by an external storage device.

FIG. 3A shows the configuration of the database generated corresponding to the input from the user at entry time and stored in the external storage device 5 through the storage unit 23. FIG. 3B shows the configuration of the database stored in advance corresponding to the input at entry time. In the following explanation, the application displayed on the monitor screen of the output device 4 is represented as a Web browser (hereinafter referred to simply as a browser) for simple explanation.

As shown in FIG. 3A, a database 25 generated corresponding to the input from the user is configured by predetermined information 25-1, positional information 25-2, identification information 25-3, and browser information 25-4. The predetermined information 25-1 is user personal information key-input by a user from the keyboard of the input device 7, and can be, for example, an ID, a password, an address, a telephone number, a name, etc. although not shown in the attached drawings.

The positional information 25-2 indicates the input field of the predetermined information operated with a mouse-click by a user and the position of the OK button for input confirmation corresponding to the input field on the dialog screen (hereinafter representatively referred to as a user authentication screen) for personal information as an embedding display or an overlapping display by a predetermined application on the window of a browser.

The identification information 25-3 specifies a user authentication screen, for example, a window title, etc., displayed on the window of the browser, and is automatically stored by the automatic information input program when the positional information is obtained as described later in detail.

The browser information 25-4 comprises a screen size information 25-4-1, a font size information 25-4-2, a font type information 25-4-3, a name 25-4-4, a version information 25-4-5, a presence/absence information 25-4-6 about buttons indicating the functions specific to a browser, and a presence/absence information 25-4-7 displayed in a small window belonging to a browser.

As shown in FIG. 3B, a database 26 generated in advance and stored in the external storage device 5 comprises difference information 26-1 between browsers and between versions, and difference information 26-2 depending on the presence/absence of buttons indicating the functions specific to a browser and a small window display belonging to the browser. The information can be obtained by displaying in advance a desired screen by different browsers or displaying desired screens between different versions.

In FIG. 2 (also FIG. 3), at entry time, that is, when predetermined information corresponding to the user authentication screen displayed on the monitor screen of the output device 4 of the computer 1 is entered, the input unit 10 outputs the predetermined information 25-1 input by the user to the predetermined information entry unit 11, and the predetermined information entry unit 11 stores (that is, enters) the predetermined information 25-1 received from the input unit 10 in the external storage device 5 through the storage unit 23.

The input unit 10 outputs the positional information of the input field into which the predetermined information 25-1 obtained by a mouse-clicking operation using a pointing device (hereinafter referred to as a mouse representing all pointing devices) such as a mouse, a stick, a trackball, a trackpad, etc. is to be input, and the positional information 25-2 about the OK button corresponding to the input field to the positional information entry unit 12, and the positional information entry unit 12 stores the positional information 25-2 received from the input unit 10 in the external storage device 5 through the storage unit 23.

The input unit 10 outputs to the positional information entry unit 12 the browser information 25-4 including the name of a browser obtained by the mouse-click on the left of the title bar in the case of, for example, the Web page, using the mouse. The positional information entry unit 12 outputs the browser information 25-4 received from the input unit 10 to the application information entry unit 13.

The application information entry unit 13 stores in the external storage device 5 through the storage unit 23 the browser information 25-4 input from the positional information entry unit 12 as the information about the information specifying the browser performing a screen display on the display device, that is, the name and version of the browser, and the screen size, the size and type of the font used for the display, and the presence/absence of other displays.

The input unit 10 obtains the identification information 25-3 such as a window title, etc. on the user authentication screen displayed as embedded on the screen being displayed on the monitor screen, and outputs the identification information 25-3 to the identification information entry unit 14. The identification information entry unit 14 stores the identification information 25-3 received from the input unit 10 in the external storage device 5 through the storage unit 23 as the information for identification of the user authentication screen The input unit 10 outputs the fingerprint data obtained by the fingerprint detection device provided in the input device 7 to the input information comparison unit 16. The input information comparison unit 16 stores the fingerprint data received from the input unit 10 in the external storage device 5 through the storage unit 23.

On the other hand, at input time, that is, when information is automatically input on the user authentication screen displayed by a predetermined browser on the monitor screen of the computer 1, the authentication screen detection unit 15 reads the identification information 25-3 stored in the external storage device 5 through the storage unit 23, monitors the displayed screen of the display device, and notifies the input information comparison unit 16 that a user authentication screen to be automatically input is being displayed on the monitor screen when the user authentication screen having the same identification information as the identification information 25-3 stored in the external storage device 5 is displayed on the screen being monitored as an embedding display or an overlapping display. The input unit 10 outputs the fingerprint data obtained by the fingerprint detection device to the input information comparison unit 16. The input information comparison unit 16 compares the fingerprint data received from the input unit 10 with the fingerprint data read from the external storage device 5 through the storage unit 23, determines whether or not the fingerprint data received from the input unit 10 matches the fingerprint data read from the external storage device 5, and, if the determination is YES, notifies the application information obtaining unit 17 that the personal authentication is valid.

Upon receipt of the notification from the input information comparison unit 16 that the personal authentication is valid, the application information obtaining unit 17 obtains the browser information about a browser displaying the Web page screen which displays a user authentication screen, and outputs the obtained browser information to the application comparison unit 18.

When the input information is entered on the user authentication screen, the application comparison unit 18 reads from the external storage device 5 through the storage unit 23 the browser information 25-4 entered as associated with the input information, compares the read browser information 25-4 with the browser information received from the application information obtaining unit 17, and notifies the application change unit 19 of matching or non-matching result information.

The application change unit 19 maintains the browser currently displaying the user authentication screen when the information received from the application comparison unit 18 is a matching result. If the received information is a non-matching result, and if the non-matching result is detected with the screen size information 25-4-1 through 25-4-4 in the browser information 25-4, that is, if the screen size, the type of font, or the size of the font displayed by the browser which currently displays the user authentication screen is different from the screen size, the type of font, or the size of the font displayed by the browser information entered when input information is entered on the user authentication screen, then the screen size, the type of font, or the size of the font of the screen being displayed is changed into the screen size, the type of font, or the size of the font displayed by the entered browser information.

The positional information computation unit 21 receives from the application change unit 19 a notification that the browser is maintained or that the change of the browser has been completed if the browser is changed, reads the positional information 25-2 about the input field and OK button entered in the external storage device 5 through the storage unit 23, computes the correct current positions of the input field and the OK button based on the difference in the information 25-4-4 through 25-4-7 in the browser information 25-4 informed by the application comparison unit 18, and notifies the input/press unit 22 of the computed positional information about the input field and the OK button.

Furthermore, the positional information computation unit 21 notifies the input/press unit 22 of the positional information 25-2 as is about the input field and OK button entered and read from the external storage device 5 if no change is made to the browser information.

The input/press unit 22 outputs the pointing information and the left-click information of the mouse into the position of the input field received from the positional information computation unit 21, sets the input field active, reads through the storage unit 23 the predetermined information 25-1 to be input which is entered in the external storage device 5, and outputs the read predetermined information 25-1 as input information. The predetermined information 25-1 is obtained on the browser side as the information to be input into the active input field.

The input/press unit 22 outputs the left-click information of the mouse into the position of the OK button received from the positional information computation unit 21. The left-click information is obtained on the browser side as the press information about the OK button.

Thus, the automatic input of the personal information to the input field on a predetermined user authentication screen, and the automatic press of the OK button for confirmation of the input are completed.

Normally, it is predicted that there will be a larger amount of financial and commodity trading, etc. performed through Internet. The Web page relating to the financial and commodity trading, etc. requires user authentication. If there is a larger amount of financial and commodity trading, etc. performed on the Web page, the user authentication is required more frequently.

In this situation, the automatic input of personal information for user authentication and the automatic press of an OK button can be performed by detecting the positions of the input field and OK button independent of a control ID or tag information. Thus, the operation of a user is not required for the frequently required user authentication which can be performed by the above mentioned automatic input and automatic press.

Figure 4:
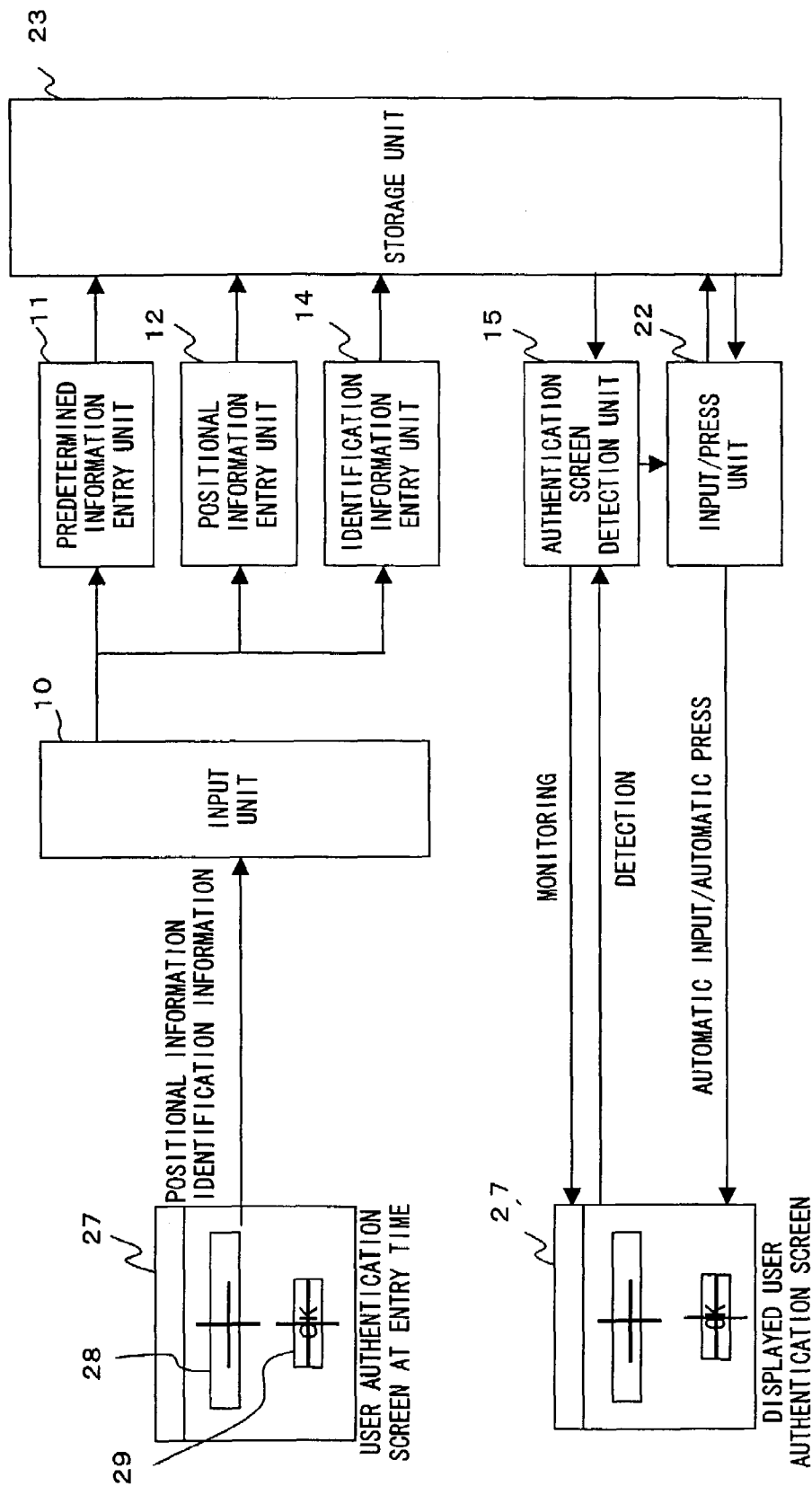
FIG. 4 shows the relationship between process function modules in the basic process of the process function modules according to the first embodiment.

FIG. 4 shows the relationship between process function modules in the basic process of the process function modules according to the first embodiment.

FIG. 5A shows a type of authentication screen at entry time displayed on the screen of the display device in the basic process, and FIG. 5B shows a type of authentication screen at input time.

Figure 6:
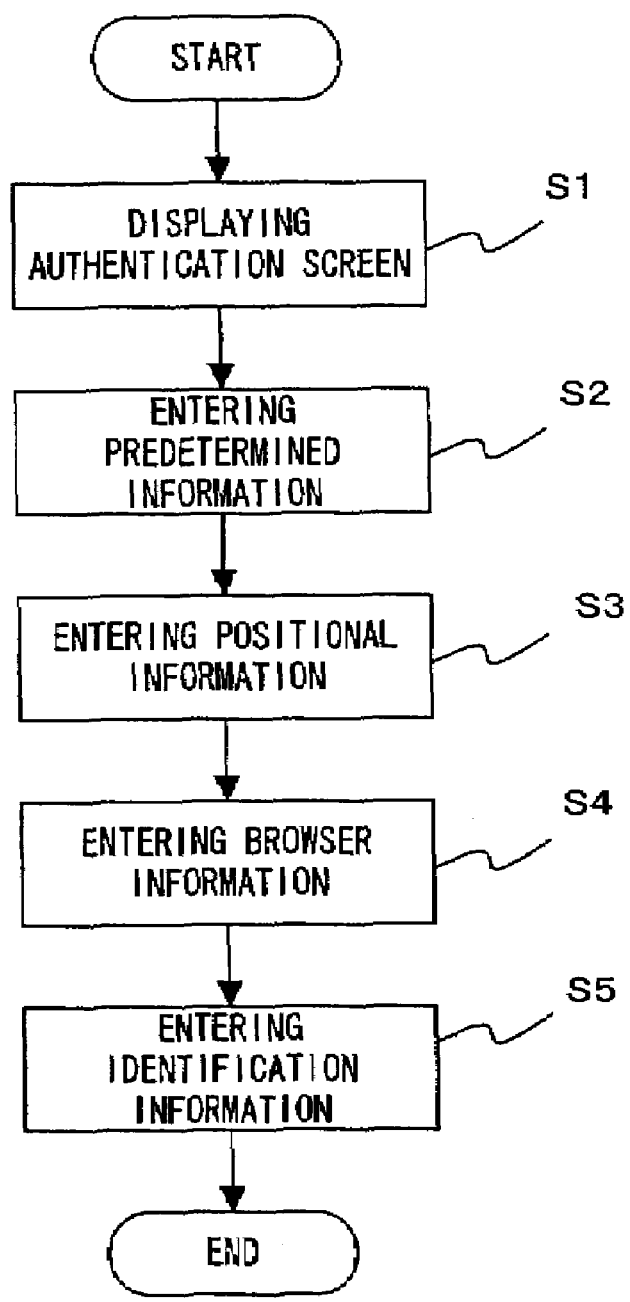
FIG. 6 is a flowchart of the process at entry time according to the first embodiment.

FIG. 6 is a flowchart of the process at entry time according to the first embodiment. In FIG. 6, S1, S2, . . . indicate the procedures of processes (It also holds true with S1, S12, . . . in the flowcharts shown in FIG. 7 and in FIGS. 15 and 16).

At the entry time in the basic process according to the first embodiment, a user authentication screen 27 (shown in FIGS. 4 and 5A) into which the predetermined information 25-1 is to be input is first displayed on the window displayed on the monitor screen by a predetermined browser by a user inputting operation in S1 shown in FIG. 6.

Then, in S2 shown in FIG. 6, the input unit 10 shown in FIG. 4 enters predetermined input information key-input from the keyboard of the input device 7 in the predetermined information entry unit 11 and the external storage device 5 through the storage unit 23 as described by referring to FIG. 2.

In S3 shown in FIG. 6, the input unit 10 shown in FIG. 4 first outputs a constant command to a browser, and obtains the coordinates of the display position on the user authentication screen notified by the browser as a return value to the command. The coordinates is the reference coordinates (0, 0) of the user authentication screen 27 as shown in FIG. 5A.

Then, the input unit 10 instructs on the screen the user to click on the positions of a input field 28 and an OK button 29 on the user authentication screen 27 in the mouse clicking operation. Thus, the mouse clicking operation is performed by the user on the positions of the input field 28 and the OK button 29, and the positional information 25-2 is obtained by the input unit 10. The obtained positional information 25-2 is entered in the positional information entry unit 12 and the external storage device 5 through the storage unit 23.

In S4 shown in FIG. 6, the browser information 25-4 is obtained from the input unit 10 shown in FIG. 4, and the browser information 25-4 is entered in the application information entry unit 13 shown in FIG. 2 and the external storage device 5 through the storage unit 23 shown in FIG. 2 (as in FIG. 4).

In S5 shown in FIG. 6, the identification information 25-3 on the user authentication screen 27 is obtained by the input unit 10 shown in FIG. 4, and the identification information 25-3 is entered in the identification information entry unit 14 and the external storage device 5 through the storage unit 23.

Thus, the predetermined information 25-1 for input in the pre-process for automatic input, an input field for input of the predetermined information 25-1, the positional information 25-2 about an OK button for confirmation of the input, the identification information 25-3 for designation of the user authentication screen 27 for input of the information, and the browser information 25-4 about the browser displaying the user authentication screen 27 are entered in advance in the external storage device 5.

Then, at input time according to the first embodiment, the authentication screen detection unit 15 shown in FIG. 4 monitors the screen displayed on the monitor screen of the output device 4, and detects that the user authentication screen 27 to which information is to be automatically input has been displayed on the screen being displayed according to the identification information 25-3 read from the external storage device 5 through the storage unit 23. The detected information is received by the input/press unit 22.

The input/press unit 22 automatically inputs as shown in FIG. 5B the predetermined information 25-1 read from the external storage device 5 and to be input in the input field 28 obtained according to the positional information 25-2 read from the external storage device 5 through the storage unit 23, and automatically presses the position of the OK button 29, thereby completing the automatic input of the predetermined information 25-1 to the input field 28 on the predetermined user authentication screen 27 and the automatic press of the OK button 29 for confirmation of the input.

FIG. 7 is a flowchart of the process at input time somewhat different from the processes shown in FIGS. 4 and 5B. In this case, in the flowchart of the entry time shown in FIG. 6, the browser information obtained in S4 includes not only the difference in type of browser as shown in FIG. 3A, but also the difference in version in the same browser, the screen size of the Web page as a parent screen on which a user authentication screen is displayed as an embedding display or an overlapping display, and also font information being used. The browser information is entered in the application information entry unit 13 and the external storage device 5 through the storage unit 23.

Normally, the display size of the Web page displayed on the browser can be easily changed using a mouse depending on the user-desired screen operation. When the display size of the Web page is changed, the size of the user authentication screen changes or does not change depending on each case. Normally, an embedding window changes in size, and an overlapping window does not change in size.

When data describing the same contents in the same markup language is displayed, the size, position, font size, etc. of an input field change if a different type of browser is used.

The presence/absence of a button (mainly displayed on the tool bar) indicating the function specific to a browser or a small window belonging to the browser changes the arrangement of the display area of the entire screen.

In any case, when the size or position of the user authentication screen displayed on the Web page changes, the positions of the input field and OK button on the user authentication screen become different from those at entry time. In such cases, the following process of the automatic information input program according to the present invention can be effective in automatic input into an input field and in automatic press of an OK button.

In S11 in FIG. 7, the authentication screen detection unit 15 monitors the screen being displayed on the monitor screen, and detects that the user authentication screen to be automatically input has been displayed on the screen being displayed.

In S12, a user inputs fingerprint data through a fingerprint data input device for user authentication.

Then, in S13, the above mentioned comparison of fingerprint data is performed by the input information comparison unit 16 shown in FIG. 2, and it is determined whether the user is successfully authenticated (input fingerprint data matches entered fingerprint data) or the user fails in authentication (input fingerprint data is different from entered fingerprint data). If the determination indicates a failure, the process terminates immediately. That is, an automatic input process is not performed.

On the other hand, if the determination indicates a success in S13, then the browser information about the browser displaying the screen on the monitor screen is obtained in S14.

Then, in S15, the obtained browser information is compared with the entered browser information 25-4 read from the external storage device 5. That is, a comparison is made whether or not there is a difference between the browser displaying a screen and the entered browser, there is a difference in version between the same browsers, the screen size of the Web page as a parent screen displaying the user authentication screen has been changed, there is a display of a tool bar displaying various unique tool button, the font size or the type has been changed, etc. The resultant difference is checked. If there is any difference, control is passed to S16. If there is no difference, then control is passed to S17.

In S16, if the size or the type of font is different from the size or the type of font at entry time, then the size or the type of font is changed into the size or the type at entry time. If the screen size on the Web page is different, it is changed into the size at entry time. If the presence/absence of the display of a tool bar is different, or the browser or the version is different from any of them at entry time, a notification is provided in S17.

In S17, the positional information 25-2 about the entered input field and OK button is read from the external storage device 5, and, if the presence/absence of the display of a tool bar on the screen being displayed is different from that at entry time, the positions of the input field and OK button changed by the presence/absence of the display of the tool bar are amended. If the browser and the version are different from those at entry time, the positions of the input field and OK button whose display areas have been changed and the display positions are changed are amended.

Afterwards, in S18, the predetermined information 25-1 entered in the external storage device 5 is read, and the predetermined information 25-1 is automatically input into the input field whose position has been confirmed by the amendment, and the OK button is automatically pressed.

The above mentioned process is further explained by referring to the user authentication screen.

Figure 8A:
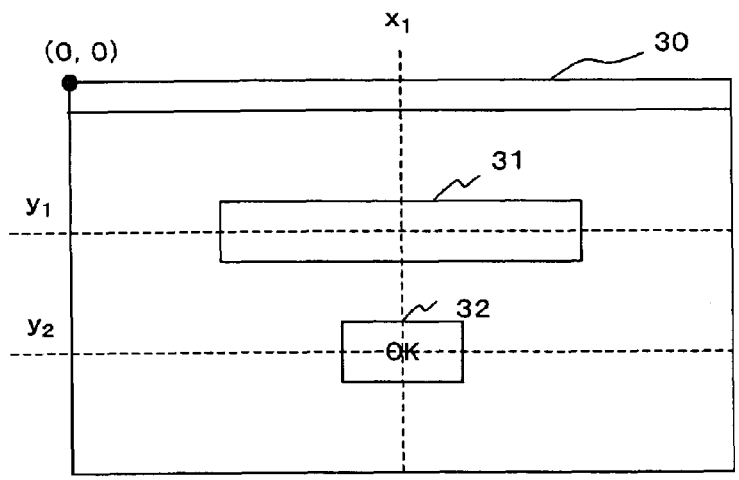
FIGS. 8A, 8B, and 8C show examples of automatic input and an automatic press when the size of the user authentication screen at input time is different from the size at entry time.
Figure 8B:
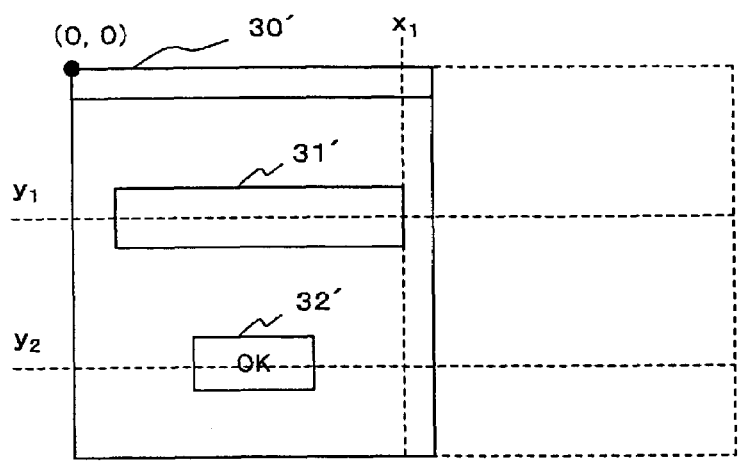
Figure 8C:
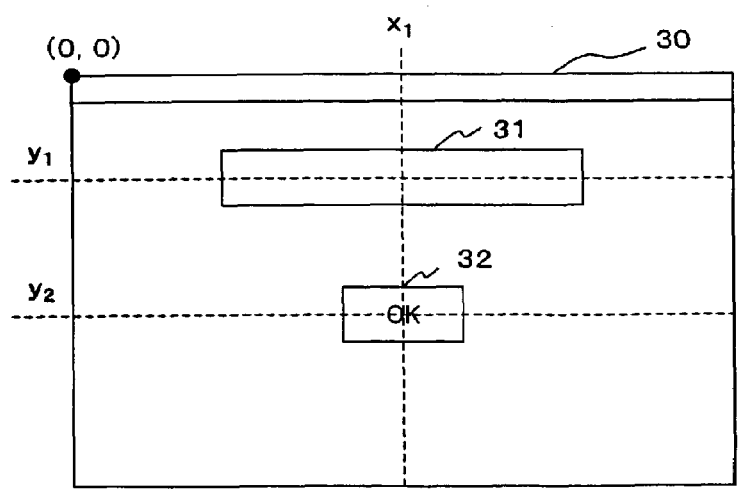

FIGS. 8A, 8B, and 8C are explanatory views of examples of automatic input and an automatic press when the size of the user authentication screen at input time is different from that at entry time. As shown in FIG. 8A, the central positions of an input field 31 and an OK button 32 on a user authentication screen 30 are respectively (x1, y1) and (x1, y2) at entry time.

However, if information is displayed on the monitor screen at input time, it is assumed that a screen size is displayed after being reduced into ½ in the horizontal direction leftwards on the screen as shown on a user authentication screen 30' in FIG. 8B. Therefore, the positions of an input field 31' and an OK button 32' are considerably shifted leftwards. Thus, if the screen size at input time is different from the size at entry time, then the display positions of the input field and OK button are different. Therefore, if the positional information 25-2 entered at entry time is used, automatic input and automatic press cannot be successfully performed.

According to the screen size information 25-41 of the browser information 25-4, the screen size currently being displayed as shown in FIG. 8B is changed into the screen size at entry time as shown in FIG. 8C. Thus, the central positions of the input field 31' and the OK button 32' shifted leftwards as shown in FIG. 8B are changed into the input field 31 and the OK button 32 in the positions (x1, y1) and (x1, y2) at entry time as shown in FIG. 8C, thereby successfully performing automatic input into the predetermined information 25-1 and an automatic press of the OK button 32 according to the positional information 25-2 at entry time.

Before the above mentioned size change, the screen size on the user authentication screen 30' being displayed is temporarily stored, the automatic input and the automatic press are completed on the user authentication screen 30 shown in FIG. 8C, and then the screen size is restored as shown in FIG. 8B based on the temporarily stored screen. Thus, the user feels quite normal in the above mentioned process, and the program can be a user-friendly program.

Not only the screen size, but also the font size and the font type on the user authentication screen 30' at input time are different from the font size information 25-4-2 and the font type information 25-4-3 at entry time shown in FIG. 3A, a change is made to display the font size and the font type at entry time, thereby changing the user authentication screen 30' at input time into the user authentication screen 30 at entry time, and easily performing the automatic input and the automatic press.

Also in this case, the font size and the font type on the user authentication screen 30' being displayed can be temporarily stored, the automatic input and the automatic press on the user authentication screen 30 can be completed, and then control can be returned to the screen display using the temporarily stored font size and font type.

Figure 9A:
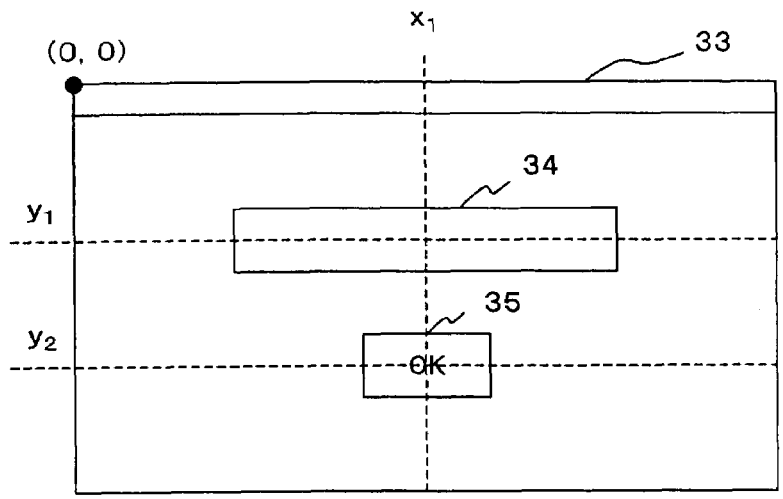
FIGS. 9A, 9B, and 9C show examples of automatic input and an automatic press when the display browser of the user authentication screen at input time is different from the display browser at entry time.
Figure 9B:
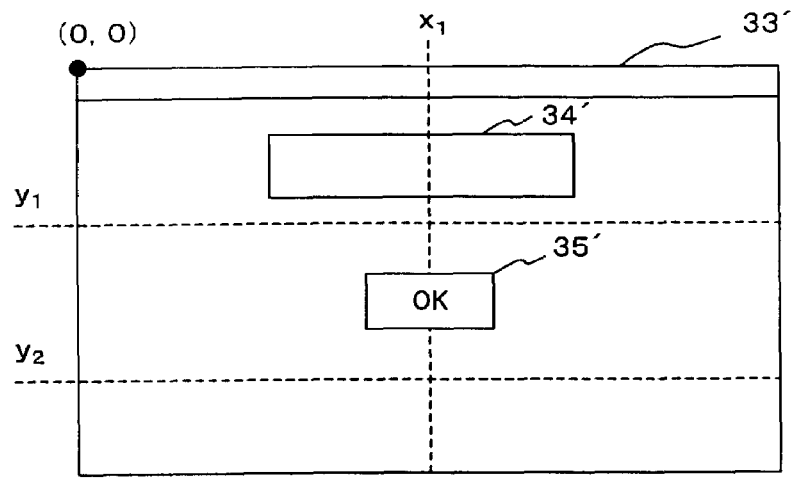
Figure 9C:
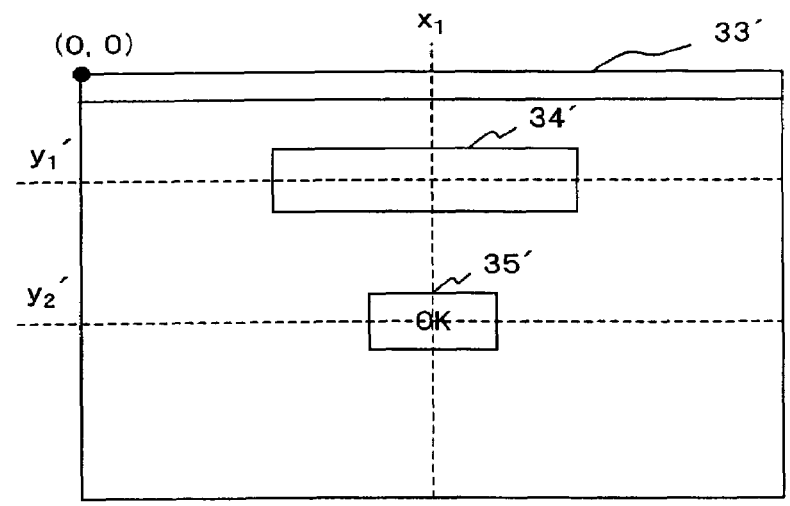

FIGS. 9A, 9B, and 9C show examples of automatic input and an automatic press when the display browser of the user authentication screen at input time is different from the display browser at entry time.

As shown in FIG. 9A, a user authentication screen 33 is displayed by a browser A at entry time, and the central position of an input field 34 is (x1, y1), and the central position of the OK button 32 is (x1, y2).

However, it is assumed that the user authentication screen displayed on the monitor screen at input time is displayed by a browser B, and displayed as a user authentication screen 33' as shown in FIG. 9B. The browsers A and B are different in the specifications of display systems. In the display of the browser B, the input field 34 and an OK button 35 shown in FIG. 9A are shifted upward as an input field 341 and an OK button 35' as shown in FIG. 9B about the y1 and y2 of the vertical coordinates.

Thus, if the positions of the input field and OK button at input time are considerably shifted upward as compared with the positions at entry time, the display positions of the input fields and OK buttons are different. Therefore, the automatic input and automatic press will fail according to the positional information 25-2 entered at entry time.

According to the difference information between the browser types shown in FIG. 3B and between browser types in the difference information 26-1 between versions, the y coordinates of the central positions of the input field 31' and the OK button 32' on the user authentication screen 33' on the display currently being displayed shown in FIG. 9B are computed, and the position (x1, y1') is amended for the input field 34', and the position (x1, y2') is amended for the OK button 35' as shown in FIG. 9C. The predetermined information 25-1 is automatically input in the correctly displayed input field 34', and the position of the OK button 35' is automatically pressed.

In this case, the amendment of the coordinates indicating the position is made only in the internal process by the automatic information input program, and no visible amendment is made on the display of the monitor screen. Therefore, no restoring process, etc. is required.

In the above mentioned example, the types of browser are different, but different versions of the same browsers can change the positions of the box images displayed on the Web page. Therefore, automatic input and a corresponding automatic press are performed by amending the coordinates of the input field and OK button as in the above mentioned example according to the difference information between the versions in the difference information 26-1 between the browsers and between the versions shown in FIG. 3B.

Figure 10A:
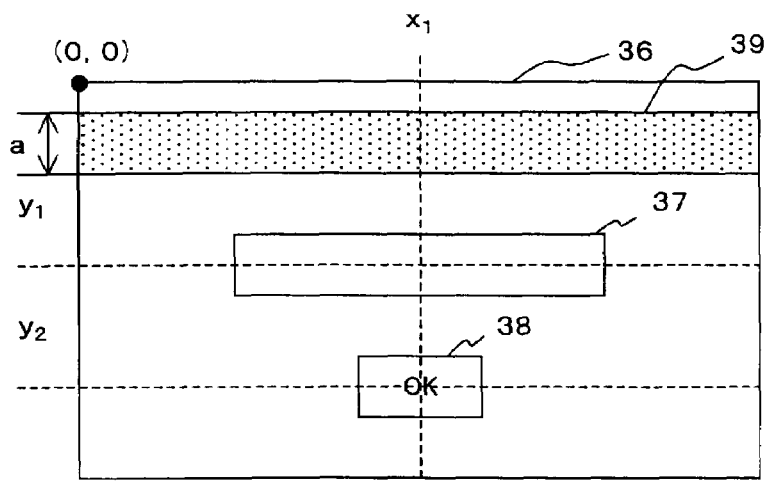
FIGS. 10A, 10B, and 10C shows example of automatic input and an automatic press when the display of buttons specific to a browser displaying a user authentication screen is different between entry time and input time.
Figure 10B:
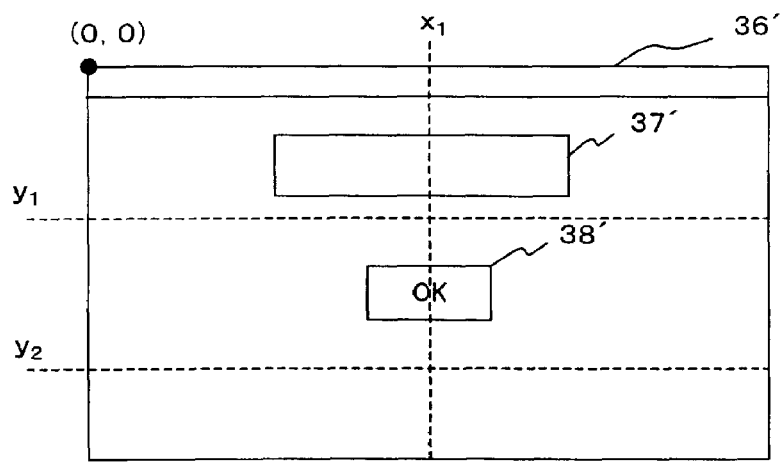
Figure 10C:
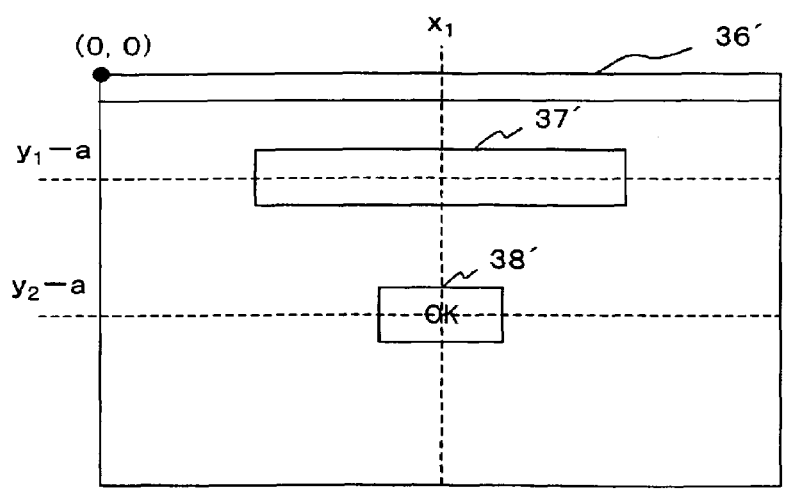

FIGS. 10A, 10B, and 10C shows example of automatic input and an automatic press when the display (display of a tool bar for display of various specific buttons) of buttons specific to a browser displaying a user authentication screen is different (displayed/not displayed) between entry time and input time.

As shown in FIG. 10A, at entry time, a tool bar 39 is displayed at the top of the window of the browser displaying a screen 36 on which user authentication is performed, and the central position of an input field 37 is the coordinates (x1, y1), and the central position of an OK button 38 is the coordinates (x1, y2).

However, a screen 36' shown in FIG. 10B on which the user authentication is performed is displayed by the same browser as at entry time, but the tool bar 39 displayed in FIG. 10A is not displayed by the user selection. Therefore, the display of the entire screen is shifted upward, and the central position of an input field 37' is shifted upward (in the y=0 direction) from the coordinates (x1, y1) as shown in FIG. 10B, and the central position of an OK button 38' is also shifted upward (in the y=0 direction) from the coordinates (x1, y2). If the value of the width of the vertical direction (y coordinate direction) of the tool bar 39 shown in FIG. 10A is 'a', the shift amount of the input field 37' and the OK button 38' is a in the y=0 direction, that is, the shift amount from the original position is '−a'.

Thus, if the positions of the input field and OK button at input time are shifted toward y=0 from the positions at entry time, then the positions of the input field and OK button are different from those at entry time. Therefore, the positional information 25-2 entered at entry time cannot be successfully used in the automatic input and automatic press.

Then, according to the difference information depending on the presence/absence of the display of buttons indicating the functions specific to the browsers in the difference information 26-2 depending on the presence/absence of the buttons indicating the functions specific to the browser shown in FIG. 3B and a small window display belonging to a browser, the correct y coordinates of the input field 37' and the OK button 38' of the screen 36' currently being displayed as shown in FIG. 10B are computed, and the input field 37' is corrected into the coordinates (x1, y1–a), and the OK button 38' is corrected into the coordinates (x1, y2–a). Then, the predetermined information 25-1 is automatically input into the corrected position of the input field 37'.

In this case, the correction of the coordinates indicating the position is performed only in an internal process by the automatic information input program, but a visible change on the display of the monitor screen is not made, thereby requiring no restoring process, etc.

In the above mentioned example, the presence/absence of the display of the buttons indicating the functions specific to a browser is explained, but depending on the presence/absence of a small window display belonging to a browser between the same browsers can change the positions of the input field and OK button displayed on the screen. In this case, automatic input is performed with an automatic press by amending the coordinates of the input field and OK button as in the above mentioned case according to the difference information depending on the presence/absence of the small window display belonging to the browser in the difference information 26-2 depending on the presence/absence of the buttons indicating the function specific to the browser shown in FIG. 3B and the small window display belonging to the browser.

No correct results may be obtained in the above mentioned processes. For example, if the width of the tool bar 39 is relatively large (when all buttons are displayed, and two stages of tool bars are displayed with the button icon set to a large icon), then the entire display of a screen with the tool bars turned off is shifted in the y=0 direction by the display area space made by the turned-off tool bar. That is, as described above, the entire screen display is not shifted in the y=0 direction by the width of the tool bar.

Therefore, there can be the possibility of unsuccessful automatic input and automatic press for predetermined information in an amended position. According to the present embodiment, automatic input and an automatic press can be successfully performed in the above mentioned case.

This method can also be applied to the second embodiment described later. Therefore, the drawings of data structures, etc. are omitted here for simple explanation. This method is used when predetermined information is automatically input and an OK button is automatically pressed, and when it is determined whether or not the automatically or the automatic press has been successfully performed by referring to a return value from the browser for the input or the press, and the determination indicates a failure. Described below are the automatic input and automatic press to be performed again.

Figure 11A:
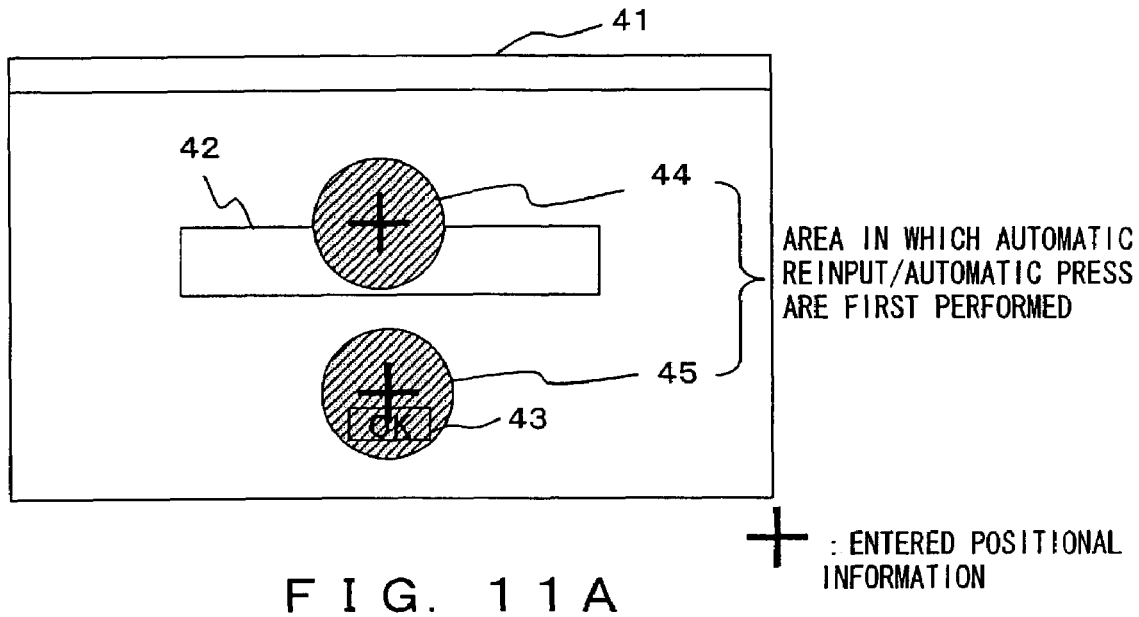
FIGS. 11A and 11B show a method for sequential and automatic input and press although the automatic input and automatic press have failed into the place after an amendment.
Figure 11B:
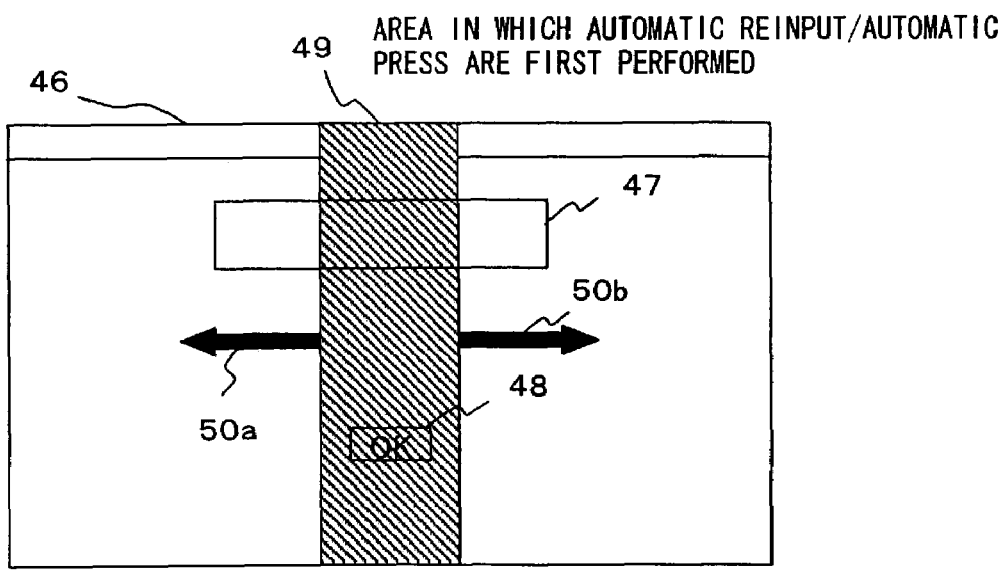

FIGS. 11A and 11B show a method for successful and automatic input and press although the automatic input and automatic press have failed into the place after an amendment.

First, although not shown in the attached drawings, an appropriate rule of determining different positions from those in which automatic input and an automatic press have failed is emperically prepared, and the rule is stored in the external storage device 5 in advance. When both automatic input and an automatic press fail, a position different from a faulty position is determined as a position in which the next automatic input and automatic press are to be performed according to the rule.

The above mentioned rule is, as shown in FIG. 11A, applied from the first faulty position on a window 41 of the browser, that is, the vicinity of the position coordinates (the cross shown in FIG. 11A) obtained by the positional information 25-2 entered in the external storage device 5. In the example shown in FIG. 11, the automatic input and automatic press are repeated while changing (determining) the position backward and clockwise or counterclockwise from the center of the cross in a spiral.

In this case, automatic re-input is repeated from the center of the cross with the position changed backward in a spiral, and with the surroundings 44 of an input field 42 set as the first automatic re-input area. When no return value of input completion is obtained from the browser, the automatic re-input is repeated until a return value of input completion can be obtained with the automatic re-input area extended to the vicinity of the surroundings 44.

Then, the automatic re-input is repeated while changing the position backward in a spiral from the center of the cross with the surroundings 45 of an OK button 43 set as the first automatic re-input area. Then, if no return value of press completion can be obtained from the browser, then the automatic re-press area is extended to the vicinity of the surroundings 45, and the automatic re-press is repeated until a return value of press completion can be obtained.

As shown in FIG. 11B, since an input field 47 and an OK button 48 are normally positioned at the center of a window 46 of a browser, the above mentioned rule can extend the automatic re-input and automatic re-press from the first faulty position to left and right from the center.

That is, on the window 46, by setting the x coordinates of the first faulty position (position obtained according to the positional information 25-2 entered in the external storage device 5) as the center, the entire range 49 above and below the center (in the y coordinate direction) is specified. If the automatic input and automatic press further fail, then the range is sequentially extended left and right (in the plus and minus direction from the center of the x coordinates) as shown by arrows 50a and 50b, and the automatic re-input and automatic re-press are repeated until a return value of success can be obtained. In any case, the automatic input and automatic press can be successfully completed.

Described below is the method of automatically inputting predetermined information and automatically pressing an OK button as the second embodiment without positional information relating to the input field and the OK button.

In this method, positional information is automatically input in the position on the user authentication screen, and it is determined whether or not the automatic input has been successfully performed. If it has failed, then the position is shifted, and automatic re-input is performed. Until the automatic input can be successfully performed, the automatic input is repeated with the position shifted. The similar process is performed on the automatic press.

Figure 12:
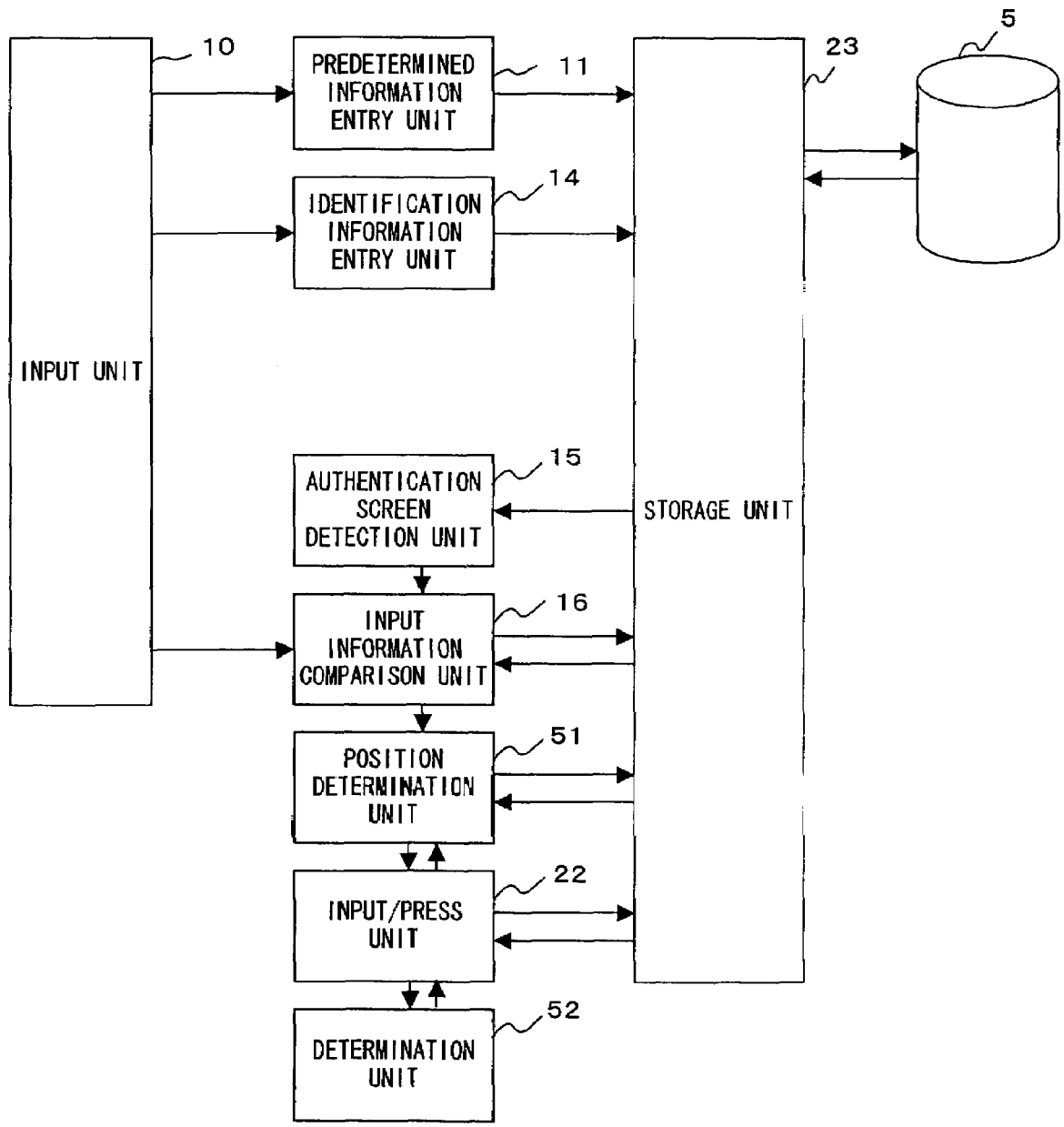
FIG. 12 is a block diagram of a process function module according to the second embodiment of the process performed by the automatic information input program executed by the CPR of the computer.

FIG. 12 is a block diagram of a process function module according to the second embodiment of the process by the automatic information input program read from the external storage device 5 of the computer 1 shown in FIG. 1 to the memory 3, and executed by the CPU 2.

As shown in FIG. 12, the process function module comprises the input unit 10, the predetermined information entry unit 11, the identification information entry unit 14, the authentication screen detection unit 15, the input information comparison unit 16, a position determination unit 51, the input/press unit 22, a determination unit 52, and the storage unit 23. The storage unit 23 is linked to the external storage device 5 shown in FIG. 1.

FIG. 13A shows the configuration of the database stored in the external storage device 5 through the storage unit 23 according to the second embodiment, and generated corresponding to the input at entry time from a user.

As shown in FIG. 13A, a database 55 generated corresponding to the input from the use is predetermined information 55-1 and identification information 55-2. In this case, the predetermined information 55-1 is the information key-input by the user from the keyboard of the input device 7. The personal information of the user can be, for example, an ID, a password, an address, a telephone number, a name, etc. It is obvious that the information is not limited to personal information, but can be any information to be input when the same information input window is displayed.

When the information input window is displayed at entry time of predetermined information, the identification information 55-2 is automatically fetched on the screen by the automatic information input program, and the identification information specifying the information input window.

As shown in FIG. 13B, a database 56 generate in advance and stored in the external storage device 5 comprises a rule 56-1 for determination of an initial position, and a rule 56-2 for change of a position.

As the above mentioned rule, the rule for determination of an initial value sets the initial position as the coordinate origin (normally the upper left corner) on the window, and the rule for change of a position sequentially moves the position to be changed in the primary scanning direction of pixel information from the coordinate origin, and sequentially repeats the movement in the secondary scanning direction down to the bottom. This method takes a long time, but is a reliable method.

According to the next method, the initial position is set at the center of the window, and the position change is made by sequentially extending left and right in the vertical direction from the central position.

On the window of a browser, an input field and an OK button are often arranged on the left of the screen. Therefore, the initial position is set on the left of the input window, and the position is sequentially changed rightward from left. Based on the above mentioned rules, the computer can efficiently perform the automatic input and the automatic press in correct positions.

Each of the identification information 55-2 shown in FIG. 13A, the rule 56-1 for determination of the initial position shown in FIG. 13B, and the rule 56-2 for change of a position is associated with the predetermined information 55-1 and stored (entered) in the external storage device 5.

In the above mentioned FIG. 12, the input unit 10 inputs predetermined information to be key-input by a user. The predetermined information entry unit 11 passes the predetermined information input by the input unit 10 to the storage unit 23. The storage unit 23 associates the predetermined information for each predetermined information input window, and stores (enters) it as the predetermined information 55-1 in the external storage device 5.

Furthermore, the input unit 10 also inputs identification information on the information input window on which the predetermined information is input. The identification information is automatically obtained by a predetermined command from the screen being displayed. The identification information entry unit 14 passes the identification information input by the input unit 10 to the storage unit 23. The storage unit 23 associates the identification information for each of the predetermined information input windows, and stores it as the identification information 55-2 in the external storage device 5.

When the authentication screen detection unit 15 monitors the monitor screen of the output device 4, and detects that a predetermined information input window corresponding to the predetermined entered information obtained through the storage unit 23 has been detected, the notification of the detection is provided for the input information comparison unit 16.

At this time, the input unit 10 outputs the fingerprint data obtained by the fingerprint detection device provided in the input device 7 to the input information comparison unit 16.

The input information comparison unit 16 compares the fingerprint data received from the input unit 10 with the fingerprint data read from the external storage device 5 through the storage unit 23, determines whether or not the fingerprint data received from the input unit 10 matches the fingerprint data read from the external storage device 5. If they match, it notifies the position determination unit 51 that the personal authentication is valid.

The position determination unit 51 determines the initial value according to the rule 56-1 for determination of the initial position read from the external storage device 5 through the storage unit 23 and shown in FIG. 13B, and the notification of the determined initial position is provided for the input/press unit 22.

The input/press unit 22 obtains the predetermined information 55-1 through the storage unit 23, and automatically inputs the predetermined information 55-1 into the position obtained from the position determination unit 51 on the predetermined information input window, or automatically presses an OK button.

The determination unit 52 obtains a return value from the application being displayed on the predetermined information input window, and determines from the return value whether or not the result of the automatic input or the automatic press indicates a success. If the result indicates a failure, it instructs the input/press unit 22 to input the information again into a different position.

The input/press unit 22 requests the position determination unit 51 to determine the next position, and the position determination unit 51 determines the next position based on the rule 56-2 for change of a position shown in FIG. 13B and read from the external storage device 5 through the storage unit 23, and notifies the input/press unit 22 of the determined position.

The input/press unit 22 repeats receiving a failure notification from the determination unit 52, requesting the position determination unit 51 for the next position, and obtaining the next position until the automatic input and automatic press are successfully performed.

Figure 14:
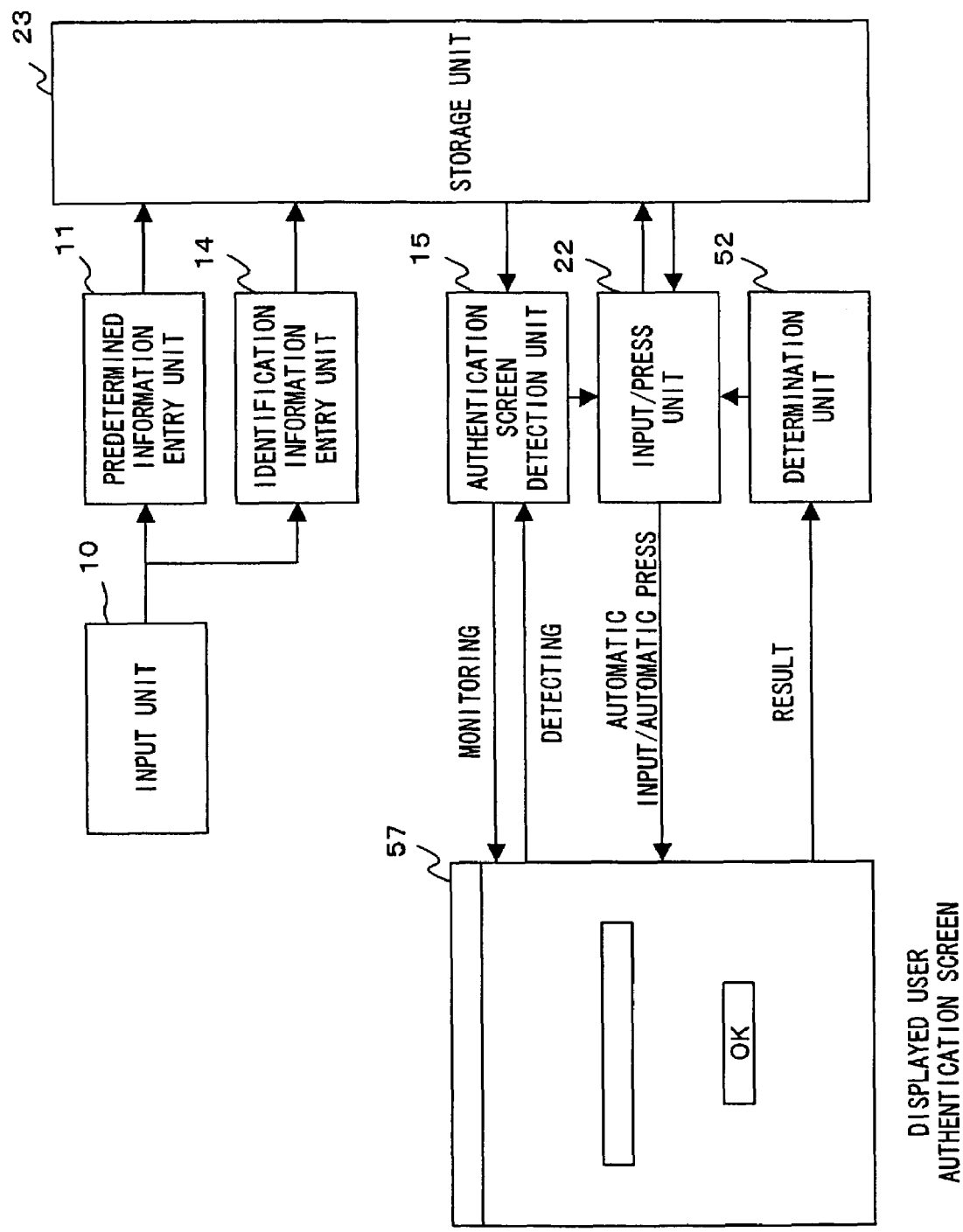
FIG. 14 shows the relationship between process function modules in the basic process of the process function modules according to the second embodiment.

FIG. 14 shows the relationship between process function modules in the basic process of the process function modules according to the second embodiment.

Figure 15:
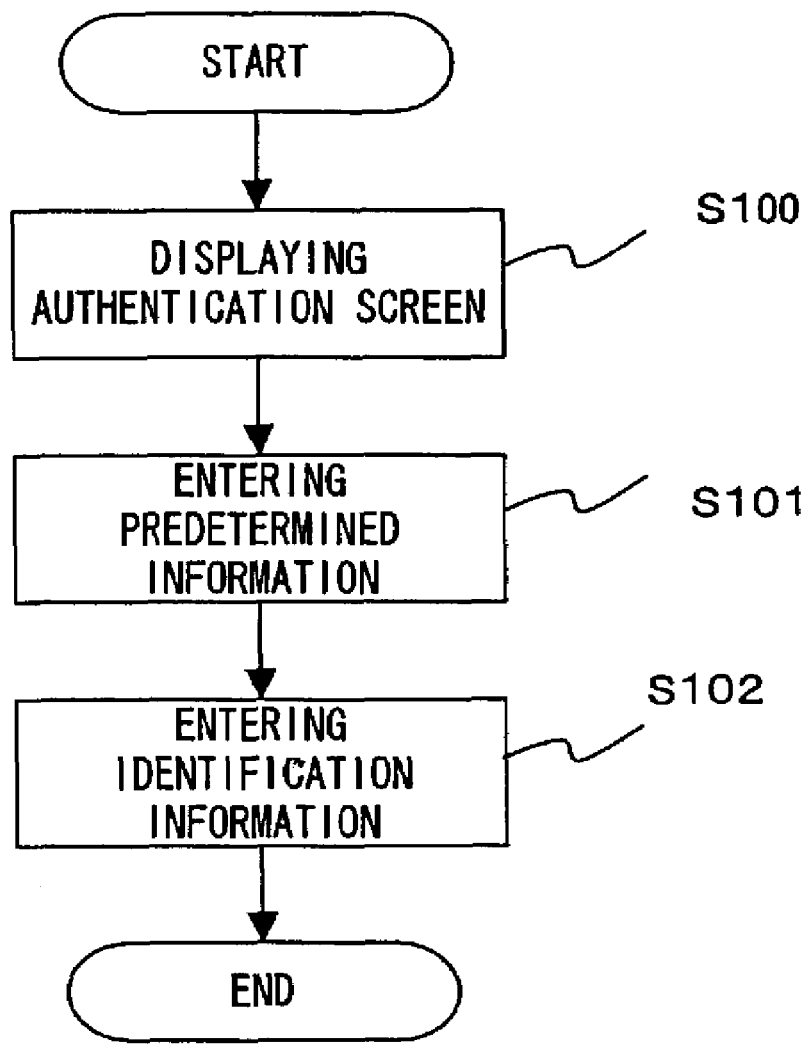
FIG. 15 is a flowchart of the process at entry time according to the second embodiment.

FIG. 15 is a flowchart of the process at entry time according to the second embodiment. In the basic process according to the first embodiment, at entry time, the information input window on which predetermined information is to be input in the user inputting operation is displayed on the monitor screen first in S100.

Then, first in S101 shown in FIG. 15, the predetermined information is input by the user into the input field on the screen displayed by the program of the present invention. The predetermined information is input by the input unit 10 shown in FIG. 14 (also refer to FIG. 12), and stored as the predetermined information 55-1 shown in FIG. 13A in the predetermined information entry unit 11 and the external storage device 5 shown in FIG. 12 through the storage unit 23.

Then, in S102 shown in FIG. 15, the input unit 10 shown in FIG. 14 fetches the identification information on the information input window. The identification information specifies the information input window of a window title, etc. as in the case of the above mentioned user authentication screen. The fetched identification information is stored as the identification information 55-2 shown in FIG. 13A in the identification information entry unit 14 and the external storage device 5 shown in FIG. 12 through the storage unit 23. According to the second embodiment, the entire entering process terminates in the above mentioned operations.

Then, in the basic operation at input time according to the second embodiment, as shown in FIG. 14, the authentication screen detection unit 15 monitors the monitor screen being displayed, and detects that the information input window on which information is to be automatically input has been displayed as a monitor screen according to the identification information 55-2 shown in FIG. 13A and read from the external storage device 5 through the storage unit 23. The input/press unit 22 is notified of the detected information.

The input/press unit 22 automatically inputs the predetermined information 55-1 in the position indicated according to the predetermined information 55-1 obtained on the predetermined information input window through the storage unit 23. Otherwise, the OK button is automatically pressed.

The determination unit 52 determines whether or not the result of the automatic input or automatic press has been a success, and notifies the input/press unit 22 of the determination result.

Figure 16:
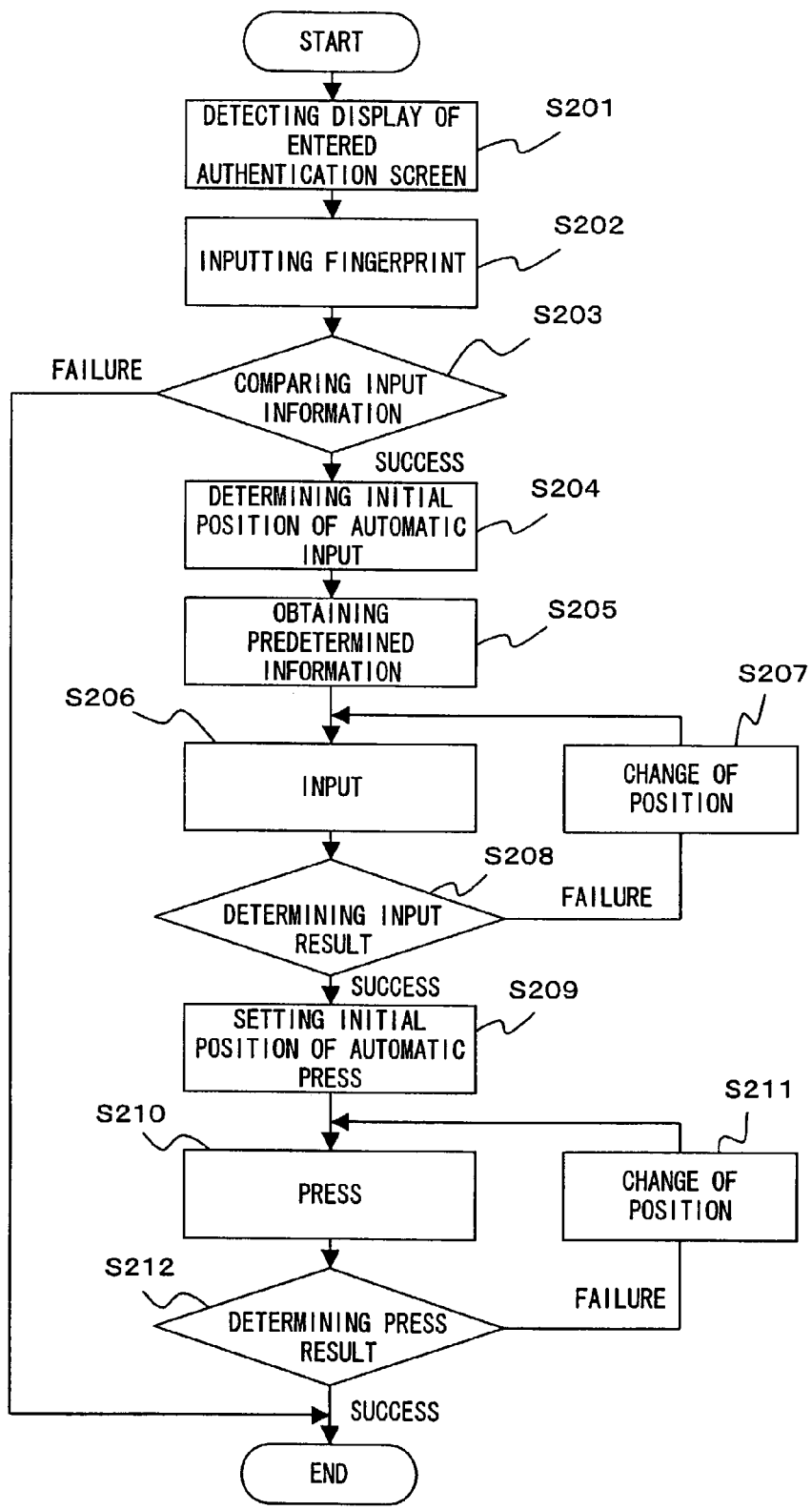
FIG. 16 is a flowchart for further detailed explanation of automatic input and an automatic press at input time according to the second embodiment.

FIG. 16 is a flowchart for further detailed explanation of the automatic input and automatic press. When the determination result of the determination unit 52 is a 'failure', the process is performed by the position determination unit 51 shown in FIG. 12, the rule 56-1 for determination of an initial position or the rule 56-2 for change of a position shown in FIG. 13B, the input/press unit 22 shown in FIG. 12, etc.

First in S201 shown in FIG. 16, the screen displayed on the monitor screen of the computer 1 is monitored to detect that the user authentication screen on which the entered predetermined information 55-1 is to be input is displayed.

Then, in S202, the user is prompted to input his or her fingerprint information. The prompt is displayed as an overlapping display on the window. The user inputs his or her own fingerprint information into the fingerprint detection device.

In S203, the input fingerprint information is compared with the fingerprint information stored in the external storage device 5, and it is determined whether or not they match each other. Control is passed to the process in S204 only if they match (success in S203). If they do not match (failure in S203), then the process immediately terminates, and another process is performed.

In S204, an initial position in which predetermined information is to be automatically input is determined according to the rule 56-1 for determination of the initial position shown in FIG. 13B. There are at least three types of rule 56-1 for determination of the initial position as described above, that is, the first rule for shifting the position in the secondary scanning direction from the primary scanning direction from the coordinates origin on the window as the initial position, the second rule for shifting the position sequentially left and right from the central vertical direction from the center on the window as the initial position, and the third rule for shifting the position sequentially right from the initial position on the left of the window.

Figure 17:
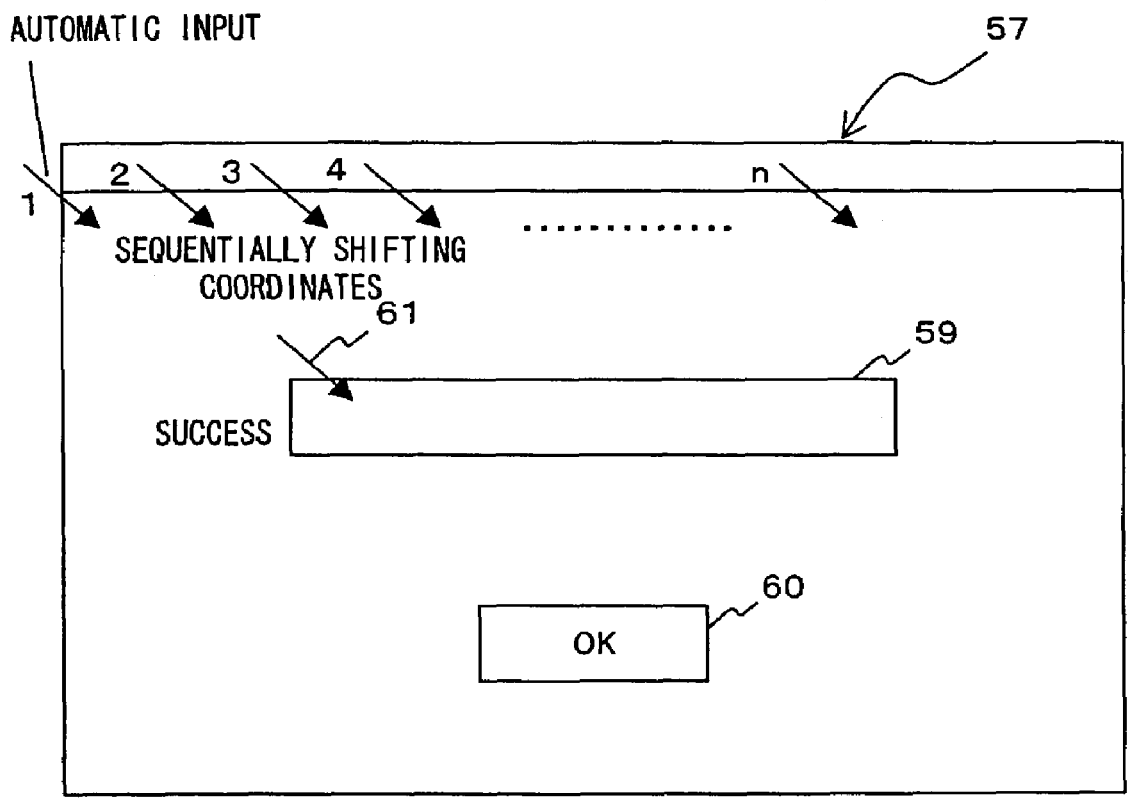
FIG. 17 shows a type of the state of changing the input position on the window according to the first rule.

FIG. 17 shows a type of the state of changing the input position on the window according to the first rule. As shown in FIG. 17, the initial position of input on the window 57 is the coordinates of the upper left corner indicated by an arrow 1. In S204, the position is determined by the arrow 1.

In S205, the predetermined information 55-1 shown in FIG. 13A is obtained from the external storage device 5 through the storage unit 23.

Then, in S206, the predetermined information 55-1 is input into the above mentioned position.

In S208, it is determined whether or not the input result is a success. If it is a failure (failure in S208), then the position is changed in S207, and control is returned to step S206. If a failure is repeated the position is sequentially shifted from left to right following the arrows 2, 3, . . . , n from the arrow 1 at the upper left corner as the initial position as shown in FIG. 17. When the right end is reached, the shift is made downward (in the secondary scanning direction), and then from left to right again. The process is repeated as described above. The rule 1 is stored in the external storage device 5 in advance.

By the above mentioned repeated processes, the changed position reaches the left end of the input field 59 as shown in FIG. 17, the input field 59 becomes active, and the predetermined information 55-1 is input as indicated by an arrow 61. Therefore, the determination in S208 indicates a 'success', thereby passing control to S209.

In S209, the initial position in which an OK button 60 shown in FIG. 17 is automatically pressed is determined. It is desired that the initial position can start after the position in which the predetermined information 55-1 has been successfully input into the input field 59 because the position of the OK button is normally below the position of the input field on a window 57 as shown by the OK button 60 shown in FIG. 17.

In S210, the determined position is automatically pressed.

In S212, it is determined whether or not the result of the press is a success. If it is a failure (failure in S212), a position change is made in S211, thereby returning control to S210. If the failure is repeated, the processes similar to those in S208, S207, S206, and S208 are repeated in S212, S211, and S210. Then, the changed position reaches the position of the OK button 60 shown in FIG. 17, the press is successfully performed (success in S212), thereby successfully terminating the process of automatic input and automatic press.

FIG. 18A shows a type of the state of changing the input position on the window according to the second rule; and FIG. 18B shows a type of the state of changing the input position on the window according to the third rule.

First in FIG. 18A, the position is shifted in the vertical direction with an initial position 63 set at the center of a window 62. If input (or a press) is a failure, then the position is determined by sequentially shifting it left and right as indicated by an arrow from the vertical direction at the center. As shown in FIG. 18A, the arrow 61 and the window 62 are located at the center on the window 62, automatic input and an automatic press can be quickly completed.

In the case shown in FIG. 18B, an initial position 67 is shifted in the vertical direction with an initial position 67 set at the left end f a window 64. If input (or a press) is a failure, then the position is sequentially shifted right from the left end as indicated by the arrow, thereby determining the position. If an input field 65 and an OK button 66 shown in FIG. 18B are displayed to the left of the position shown in FIG. 18B on the window 64, then the processes of the automatic input and automatic press are quickly completed.

The above mentioned three examples show the two processes of inputting predetermined information and an automatic press of an OK button. However, they can also be applied to automatic input of an ID and a password as the predetermined information into the two input fields individually.

Similarly, they can also be applied to input of predetermined information as an ID and a password by inputting one or both of ID and password into one input field.

Furthermore, in the above mentioned first or second embodiment, when a user authentication screen is generated relating to obtaining the identification information 25-3 shown in FIG. 3A or the predetermined information 55-1 shown in FIG. 13A, additional information can be added to a file information such as a window title, etc. although not shown in the attached drawings.

The additional information can be character string information uniquely specifying the user authentication screen. That is, in the case of a file described in the HTML, a comment tag (<! .. , .. !>) not displayed on the window of the browser can be used, and character string information (for example, the system of the present invention+application name, etc.) can be described.

Then, when file information is entered, only the contents (in the example shown in FIG. 3, the name 25-4-4 of the application) of the comment describing the system of the present invention are entered. When a user authentication screen is detected, it is determined depending on the presence/absence of additional information. If there is additional information, it is determined from the contents of the comment whether or not they are entered in the external storage device 5.

Thus, by adding in advance the additional information in the method according to the present invention, other file information can be clearly discriminated. Furthermore, the amount of the necessary file is smaller than in the case of entering all file information and only a part of the file information is compared, thereby shortening the comparison time.

Thus, in any of the above mentioned embodiments, predetermined information can be automatically input and an OK button can be automatically pressed with the position of an input field of predetermined information specified independent of an input information storing method unique to a general purpose application, a control ID, tag information, etc. and without changing the application displaying the input field of the predetermined information (when the window is changed or a position is detected in the present invention, a change is made to the screen in a display type being displayed by the application, but not to the application itself).

In the above mentioned embodiments, the user authentication screen displayed by a browser is described, but the present invention is not limited to the screen, but the predetermined information input window displayed by the application such as mail software, etc., the screen displayed by a browser can also be used in applying automatic input of the predetermined information into an input field of a dialog box activated as another screen from the browser.

When the application displayed on the screen is a browser, the present invention can input predetermined information into an input field embedded in the display area on the browser, and the user authentication screen is not limited to.

Inputting predetermined information into the input field of the present invention is widely applied to various uses such as, in addition to the above mentioned mail software, log-in to Windows (registered trademark), release of a lock of a screen saver, password input when a network is connected, authentication when dialing a telephone, locking a password on an MS OFFICE (registered trademark) file, access to a home page exclusive to members, etc.

Furthermore, in the above mentioned embodiment, an input field and an OK button are used for example, but it is obvious that a plurality of input fields and OK buttons can be used. In this case, according to the first embodiment, the positions of a plurality of input fields and OK buttons are obtained in advance for entry together with predetermined information. Then, at input time, the process of automatically inputting the predetermined information can be repeated for each piece of predetermined information. The same process can be performed on the OK button.

What is claimed is:

1. A computer-readable medium storing an automatic information input program for directing a computer to perform a process of automatically inputting predetermined information into a moveable input field on an input window for input of predetermined information on an input window displayed on a monitor screen in an application, comprising:
   at an entry time,
      an information entering process of entering the predetermined information, and
      an input position entering process of entering initial positional information about the moveable input field on the input window corresponding to a position of the moveable input field displayed on the monitor screen; and
   at an input time,
      a personal authentication process of performing personal authentication based upon biometric information,
      an automatic inputting process of automatically inputting the predetermined information when the personal authentication is valid,
   said automatic inputting process comprising:
      an input position detecting process of detecting the position of the moveable input field on the input window displayed on the monitor screen based on the initial positional information entered in the input position entering process,
      an information input process of automatically inputting the predetermined information entered in the information entering process into the moveable input field detected in the input position detecting process,
      an input success/failure detecting process of detecting whether an automatic input of the predetermined information into the moveable input field has been successfully performed;
      a search area setting process of setting a predetermined search area on the monitor screen when a failure has been detected in the input success/failure detecting process; and
      a trial process of automatically inputting the predetermined information by moving a position of the search area set in the search area selling process.

2. The computer readable medium according to claim 1, wherein
   said computer can further perform:
   at the entry time,
      a button position entering process of entering initial positional information of a button corresponding to the moveable input field, the initial positional information of the button corresponding to a position of the button on the monitor screen; and
   at the input time,
      a button position specifying process of specifying the position of the button on the monitor screen, based on the initial positional information entered in the button position entering process, and
      a pressing process of automatically pressing the button in the position specified in the button position specifying process.

3. The computer readable medium according to claim 1, wherein
   said computer can further perform:
   at the entry time, an identification information obtaining process of obtaining identification information for specification of the application displaying the moveable input field from the application, and an identification information entering process of entering the identification information obtained in the identification information obtaining process; and at the input time, a display detecting process of monitoring a screen displayed on the monitor screen and detecting that the screen is displayed by the application holding the identification information entered in the identification information entering process.

4. The computer readable medium according to claim 1, wherein said computer can perform:

an entering process of entering as the position of the moveable input field on the monitor screen, the position specified by a pointing device as an input position in the input position entering process; and an entering process of entering as the position of the button the position pressed by the pointing device in the button position entering process.

5. The computer readable medium according to claim 1, wherein the computer can perform:

at the entry time, a size entering process of entering the size information about a screen displayed on the monitor screen; and at input time, a screen size changing process of automatically changing the size of the screen being displayed into the size at size entry time according to the size information about the screen entered in the size entering process when the size of the screen being displayed on the monitor screen is different from the size at size entry time of the screen.

6. The computer readable medium according to claim 5, wherein the computer can further perform a screen size restoring process of restoring the size of the screen whose size has been changed in the screen size changing process into the originally displayed screen size after automatically inputting the predetermined information and/or automatically pressing the button.

7. The computer readable medium according to claim 1, wherein said computer can further perform:

at the entry time, a font information entering process of entering the size information and the type information about a character font used on the window of the monitor screen; and at the input time, a font changing process of changing the size and/or type of the font used on a screen being displayed into the size and/or type of the entered font when the size and/or type of the font used on the screen being displayed on the monitor screen is different from the size and/or type of the font at entry time.

8. The computer readable medium according to claim 7, wherein said computer can further perform a font restoring process of restoring the size and/or type of a font on the screen changed in the font changing process into the size and/or type of the font on the originally displayed screen after an automatic input of the predetermined information and/or an automatic press of the button.

9. The computer readable medium according to claim 1, wherein said computer can perform:

at the entry time, an application information obtaining process of obtaining initial positional information corresponding to the position of the moveable input field and/or a button on the monitor screen for the type and/or version of the application displaying the moveable input field and/or the button, and an application information entering process of entering the initial positional information corresponding to the position of the moveable input field and/or the button on the monitor screen for the type and/or version of the application according to obtained in the application information obtaining process; and at the input time, a position computing process of computing the position, on the monitor screen, of the moveable input field and/or the button in the application of a different type and/or version according to difference information entered in advance for the difference on the monitor screen display between the types and/or versions of the applications, when the type and/or version of the application displaying the moveable input field and/or button on the monitor screen is different from the type and/or version of the application displaying the button.

10. The computer readable medium according to claim 1, wherein said computer can perform:

at the entry time, another display presence/absence entering process of entering the presence/absence of another display as to whether there is a display of a button indicating the function specific to an application and/or a display of a small window belonging to an application for the position of the moveable input field and/or button displayed on the monitor screen, and another display difference information entering process of entering the difference information corresponding to the presence/absence of another display for the position of the moveable input field and/or button on the monitor screen; and at the input time, a position computing process of computing the display position, on the monitor screen, of the moveable input field and/or the button being displayed in the application according to the difference information entered in the other display difference information entering process when the presence/absence of the other display in the application displaying the moveable input field and/or button on the monitor screen is different from the presence/absence of the other display entered at entry time.

11. The computer readable medium according to claim 1, wherein said computer can further perform at an input time:

a trial frequency control process of performing control such that the movement of the position in the search area and the automatic input of the predetermined information and/or the automatic press of the button are tries until a predetermined result can be obtained if the automatic input of the predetermined information and/or the automatic press of the button has failed in the trial process.

12. The computer readable medium according to claim 11, wherein said computer can further perform:

at the input time, a rule entering process of entering a predetermined rule specifying a different search area; and a repeating process of repeating the trial process under the control of the trial frequency control process while moving the position from a reference position specified according to the rule entered in the rule entering process if the automatic input of the predetermined information into the moveable input field and/or the automatic press of the button has failed in the trial process under the trial frequency control process in the search area set in the search area setting process.

13. A computer-readable medium storing an automatic information input program for directing a computer to perform a process of automatically inputting information about a moveable information input field displayed on a monitor screen of an application, comprising:
- a personal authentication process of performing personal authentication based upon biometric information,
- an automatic inputting process of automatically inputting the information when the personal authentication is valid,
- said automatic inputting process comprising:
  - an initial position determining process of determining the initial position of the moveable information input field on the monitor screen, into which the information is to be automatically input in a predetermined search area on a screen displayed on the monitor screen;
  - a next position determining process of sequentially moving a next automatic input position to a different position, on the monitor screen, at a predetermined rule based on an initial position determined in the initial position determining process;
  - an input process of automatically inputting the information in a position determined in the initial position determining process and/or the next position determining process;
  - an input success/failure detecting process of detecting whether information has been successfully input into the moveable information input field by an automatic information input in the input process;
  - a search area setting process of setting a predetermined search area on the monitor screen when a failure has been detected in the input success/failure detecting process; and
  - a trial process of automatically inputting the information by moving a position of the search area set in the search area setting process,
  - said trial process comprising a control process of controlling each of the processes such that when a failure is detected in the input success/failure detecting process on the automatic information input performed by the input process on the position determined in the initial position determining process, the next position determining process determines the next position, the input process automatically inputs the information in the position, the input success/failure detecting process detects the success/failure of the input for the automatic information input, the next position determining process determines again the next position when a failure is detected in the detecting process, the input process automatically inputs the information in the position, and the input success/failure detecting process detects the success/failure of an input on the automatic information input until a predetermined input result can be obtained.

14. A computer-readable medium storing an automatic information input program for directing a computer to perform a process of automatically pressing a push button of an application displayed on a monitor screen, comprising:
- a personal authentication process of performing personal authentication based upon biometric information; and
- an automatic inputting process of automatically pressing the push button when the personal authentication is valid,
- said automatic inputting process comprising:
  - an initial position determining process of determining an initial position of the push button on the monitor screen, in which the push button is to be automatically pressed in a predetermined search area on a screen displayed on the monitor screen;
  - a next position determining process of sequentially moving a next automatic press position to a different position, on the monitor screen, at a predetermined rule based on the initial position determined in the initial position determining process;
  - a pressing process of automatically pressing the push button in the position determined in the initial position determining process and/or the next position determining process;
  - a press success/failure detecting process of detecting whether the push button has been successfully pressed by the automatic press in the pressing process;
  - a search area setting process of setting a predetermined search area on the monitor screen when a failure has been detected in the press success/failure detecting process; and
  - a trial process of automatically pressing the push button by moving a position of the search area set in the search area setting process,
  - said trial process comprising a control process of controlling each of the processes such that when a failure is detected in the successful/faulty press detecting process on the automatic press performed by the pressing process on the position determined in the initial position determining process, the next position determining process determines the next position, the pressing process automatically presses the push button in the position, the input success/failure detecting process detects the success/failure of the press for the automatic press, the next position determining process determines again the next position when a failure is detected in the detecting process, the pressing process automatically presses the push button in the position, and the input success/failure detecting process detects the success/failure of a press on the automatic press until a predetermined press result can be obtained.

15. The computer readable medium according to claim 13, wherein when the information is automatically input, said input information entering process for entering in advance the information and said information input process for inputting the information entered in advance when the information is automatically input are performed by the computer.

16. The computer readable medium according to claim 13, wherein said computer can further perform:
- an identification information entering process of obtaining in advance identification information specifying the application for displaying the moveable information input field into which the predetermined information entered in advance from the application, and entering in advance the obtained identification information; and
- a display detecting process of monitoring the screen displayed on the monitor screen, and detecting a display on the screen by the application having the identification information entered in the identification information entering process.

17. The computer readable medium according to claim 14, wherein said computer can further perform:
- an identification information entering process of obtaining in advance identification information specifying an application for displaying a moveable input field into which predetermined information is entered in advance from the application, and entering in advance the obtained identification information; and a display detecting process of monitoring the screen displayed on the monitor screen, and detecting a display on the screen by the application having the identification information entered in the identification information entering process.

18. The computer readable medium according to claim 13, wherein said computer can further perform:

an initial position determination rule entering process of entering a first rule for determination of the initial input position in the initial input position determining process and/or a second rule for determination of the initial press position in the initial press position determining process; with the initial input position determining process performed such that the initial input position can be determined according to the first rule entered in the initial position determination rule entering process, and/or with the initial press position determining process performed such that the initial press position can be determined according to the second rule entered in the initial position determination rule entering process.

19. The computer readable medium according to claim 14, wherein said computer can further perform:

an initial position determination rule entering process of entering a first rule for determination of the initial input position in the initial input position determining process and/or a second rule for determination of the initial press position in the initial press position determining process; with the initial input position determining process performed such that the initial input position can be determined according to the first rule entered in the initial position determination rule entering process, and/or with the initial press position determining process performed such that the initial press position can be determined according to the second rule entered in the initial position determination rule entering process.

20. The computer readable medium according to claim 13, wherein said computer can further perform:

a next position determination rule entering process of entering a third rule for determination of the next input position in a next input position determining process and/or the fourth rule for determination of the next press position in a next press position determining process, with the next input position determining process performed such that the next input position can be determined according to the third rule entered in the next position determination rule entering process, and the next press position determining process performed such that the next press position can be determined according to the fourth rule entered in the next position determination rule entering process.

21. The computer readable medium according to claim 14, wherein said computer can further perform:

a next position determination rule entering process of entering a third rule for determination of the next input position in a next input position determining process and/or the fourth rule for determination of the next press position in a next press position determining process, with the next input position determining process performed such that the next input position can be determined according to the third rule entered in the next position determination rule entering process, and the next press position determining process performed such that the next press position can be determined according to the fourth rule entered in the next position determination rule entering process.

22. The computer readable medium according to claim 1, wherein:

said computer can perform:

a file information entering process of entering in advance file information about markup language for generation of a window as the identification information for designation of the input window on the monitor screen for display of the moveable input field;

at the input time, a file information obtaining process of obtaining the file information about the window displayed on the monitor screen, a comparing process of comparing the file information obtained in the file information obtaining process with the file information entered in the file information entering process, and an execution control process of controlling the predetermined information to be automatically input and/or a button to be automatically pressed on the window when the file information match in the comparing process.

23. The computer readable medium according to claim 13, wherein:

said computer can perform:

a file information entering process of entering in advance file information about markup language for generation of a window as the identification information for designation of the window on the monitor screen for display of the moveable information input field; and at an input time, a file information obtaining process of obtaining the file information about the input window displayed on the monitor screen, a comparing process of comparing the file information obtained in the file information obtaining process with the file information entered in the file information entering process, and an execution control process of controlling the predetermined information to be automatically input and/or the button to be automatically pressed on the window when the file information match in the comparing process.

24. The computer readable medium according to claim 14, wherein:

said computer can perform:

a file information entering process of entering in advance file information about markup language for generation of a window as the identification information for designation of the window on the monitor screen for display of the moveable input field; and at an input time, a file information obtaining process of obtaining the file information about the window displayed on the monitor screen, a comparing process of comparing the file information obtained in the file information obtaining process with the file information entered in the file information entering process, and an execution control process of controlling the predetermined information to be automatically input and/or the button to be automatically pressed on the window when the file information match in the comparing process.

25. The computer readable medium according to claim 1, wherein said computer can perform:

an additional information adding process of adding predetermined additional information in a predetermined description position in a file described in the markup language on the screen displaying the moveable input field and/or the button on the monitor screen; and at the input time, a discriminating process of discriminating whether predetermined additional information is additionally described in a predetermined description position in a markup language on the window displayed on the monitor screen, and an execution control process of controlling the predetermined information to be automatically input and/or the button to be automatically pressed on the window when predetermined additional information is discriminated in the discriminating process.

26. The computer readable medium according to claim 13, wherein said computer can perform:

an additional information adding process of adding predetermined additional information in a predetermined description position in a file described in the markup language on the screen displaying the moveable information input field and/or the button on the monitor screen; and at an input time, a discriminating process of discriminating whether predetermined additional information is additionally described in a predetermined description position in a markup language on the window displayed on the monitor screen, and an execution control process of controlling the predetermined information to be automatically input and/or the button to be automatically pressed on the window when predetermined additional information is discriminated in the discriminating process.

27. The computer readable medium according to claim 14, wherein said computer can perform:

an additional information adding process of adding predetermined additional information in a predetermined description position in a file described in the markup language on the screen displaying a moveable input field and/or the button on the monitor screen; and at an input time, a discriminating process of discriminating whether predetermined additional information is additionally described in a predetermined description position in a markup language on the window displayed on the monitor screen, and an execution control process of controlling the predetermined information to be automatically input and/or the button to be automatically pressed on the window when predetermined additional information is discriminated in the discriminating process.

28. The computer readable medium according to claim 1, wherein said computer can perform:

a process of automatically inputting into the moveable input field an ID or a password, or both of them as the predetermined information.

29. The computer readable medium according to claim 13, wherein said computer can perform:

a process of automatically inputting into the moveable information input field an ID or a password, or both of them as the predetermined information.

30. The computer readable medium according to claim 13, wherein the computer can perform:

an initial position determining process of setting a top end of a predetermined display area on the monitor screen as an initial position into which the predetermined information is automatically input;

a next position determining process of moving a next input position sequentially downwards using the initial position determined in the initial position determining process as a reference;

an input process of sequentially and automatically inputting an ID and a password into the two positions determined in the initial position determining process and/or the next position determining process;

an input success/failure detecting process of detecting whether the ID and/or a password has been successfully input into the moveable information input field by automatic information input in the input process; and a control process of controlling each of the processes such that when a failure is detected in the input success/failure detecting process on the automatic input performed by the input process on the position determined in the initial position determining process, the next position determining process determines the next position, the input process automatically inputs the information in the position, the input success/failure detecting process detects the success/failure of the input for the automatic input, the next position determining process determines again the next position when a failure is detected in the detecting process, the input process automatically inputs the information in the position, and the input success/failure detecting process detects the success/failure of an input on the automatic input until a predetermined input result can be obtained.

31. The computer readable medium according to claim 1, wherein said window on the monitor screen can be a window of a Web page relating to an electronic transaction, and the predetermined information can be necessary information for purchase of merchandise in the electronic transaction.

32. The computer readable medium according to claim 13, wherein said window on the monitor screen can be a window of a Web page relating to an electronic transaction, and the predetermined information can be necessary information for purchase of merchandise in the electronic transaction.

33. The computer readable medium according to claim 1, wherein said moveable input field can be an information input field of a Web page, an information input field of mail software, a dialog box activated as another screen by a browser, or a similar information input field.

34. The computer readable medium according to claim 13, wherein said moveable information input field can be an information input field of a Web page, an information input field of mail software, a dialog box activated as another screen by a browser, or a similar information input field.

35. The computer readable medium according to claim 14, wherein a moveable input field can be an information input field of a Web page, an information input field of mail software, a dialog box activated as another screen by a browser, or a similar information input field.

36. The computer readable medium according to claim 1, wherein said application with said moveable input field cannot be changed.

37. The computer readable medium according to claim 13, wherein said application with said moveable information input field cannot be changed.

38. An automatic information input method automatically inputting predetermined information into a moveable input field and automatically pressing a button on a window displaying the moveable input field and the button corresponding to the moveable input field of an application on a monitor screen, comprising:

at an entry time, entering the predetermined information, entering initial positional information about the input moveable field on the window corresponding to a position of the moveable input field displayed on the monitor screen, entering initial positional information about the button on the window corresponding to a position of the button displayed on the monitor screen, obtaining, from the application, the identification information specifying the application for displaying the moveable input field and the button, and entering the identification information obtained in the identification information obtaining; and at an input time, performing personal authentication based upon biometric information, automatically pressing the button when the personal authentication is valid, said automatic pressing performed according to a process comprising:

monitoring a screen displayed on the monitor screen and detecting that screen display is performed by the application having the identification information entered in the identification information entering, detecting the position of the moveable input field on the monitor screen based on the initial positional information entered in the input position entering, automatically inputting the predetermined information entered in the information entering in the moveable input field detected in the input position detecting, specifying the position of the button on the monitor screen based on the initial positional information entered in the button position entering, automatically pressing the button in the position specified in the button position specifying an press success/failure detecting process of detecting whether an automatic press of the button has been successfully performed;

a search area setting process of setting a predetermined search area on the monitor screen when a failure has been detected in the press success/failure detecting process; and a trial process of automatically pressing the button by moving a position of the search area set in the search area setting process.

39. An automatic information input method automatically inputting predetermined information into a moveable input field and automatically pressing a button on a window displaying the moveable input field and the button corresponding to the moveable input field of an application on a monitor screen, comprising:

entering in advance the predetermined information;

obtaining in advance from the application the identification information specifying the application for displaying the moveable input field and the button, and entering in advance the obtained identification information;

monitoring the screen displayed on the monitor screen, and detecting that screen display is performed by the application having the identification information entered in the identification information entering;

performing personal authentication based upon biometric information, automatically inputting the predetermined information and/or automatically pressing a button when the personal authentication is valid, said automatic inputting process comprising:

setting a predetermined position corresponding to a position of the moveable input field displayed on the monitor screen;

sequentially moving a next input position using the predetermined position set in the initial position determining as reference according to a predetermined rule;

sequentially and automatically inputting the predetermined information and automatically pressing the button in the two positions determined in the initial position determining and/or the next position determining;

detecting whether the automatic input and/or the automatic press in the inputting/pressing has been successful;

setting a predetermined search area on the monitor screen when a failure has been detected and automatically inputting the predetermined information and/or automatically pressing the button by moving a position of the search area set in the search area setting process by repeating, when the successful/faulty input/press detecting detects a failure in the automatic input and/or automatic press performed in the inputting/pressing on the position determined in the initial position determining, the next position determining the next position, the inputting/pressing performing the automatic input and/or automatic press on the position, and the successful/faulty input/press detecting the success/failure of input/press on the automatic input and/or the automatic press; and, when a failure is detected in the detecting, the next position determining the next position again, the inputting/pressing performing the automatic input and/or press on the position, the successful/faulty input/press detecting the success/failure of the input/press on the automatic input and/or press.

40. An automatic information input apparatus including a processor automatically inputting predetermined information into a moveable input field and automatically pressing a button on a window displaying the moveable input field and the button corresponding to the moveable input field of an application on a monitor screen, comprising:

at an entry time, an information entry unit entering the predetermined information, an input position entry unit entering initial positional information, on the monitor screen, about the moveable input field on the window displayed on the monitor screen, a button position entry unit entering initial positional information, on the monitor screen, about the button on the window displayed on the monitor screen, an identification information obtaining unit obtaining from the application the identification information specifying the application for displaying the moveable input field and the button, and an identification information entry unit entering the identification information obtained in the identification information obtaining unit; and at an input time, a personal authentication unit performing personal authentication based upon biometric information, an automatic inputting unit automatically inputting the predetermined information and/or automatically pressing a button when the personal authentication is valid, said automatic inputting unit comprising:
- a display detection unit monitoring the screen displayed on the monitor screen and detecting that screen display is performed by the application having the identification information entered in the identification information entry unit,
- an input position detection unit detecting the position of the moveable input field on the monitor screen based on the initial positional information entered in the input position entry unit,
- an information input unit automatically inputting the predetermined information entered in the information entry unit in the moveable input field detected by the input position detection unit,
- a button position specification unit specifying the position of the button on the monitor screen based on the initial positional information entered in the button position entry unit,
- a pressing unit automatically pressing the button in the position specified in the button position specification unit,
- an input success/failure detecting unit detecting whether an automatic press of the button has been successfully performed,
- a search area setting unit setting a predetermined search area on the monitor screen when a failure has been detected in the input success/failure detecting process, and
- a trial unit automatically pressing the button by moving a position of the search area set by the search area setting unit.

41. An automatic information input apparatus including a processor automatically inputting predetermined information into a moveable input field and automatically pressing a button on a window displaying the moveable input field and the button corresponding to the moveable input field of an application on a monitor screen, comprising:
- an input position entry unit entering in advance the predetermined information;
- an identification information entry unit obtaining in advance from the application the identification information specifying the application for displaying the moveable input field and the button, and entering in advance the obtained identification information;
- a display detection unit monitoring the screen displayed on the monitor screen, and detecting that screen display is performed by the application having the identification information entered in the identification information entry unit;
- a personal authentication unit performing personal authentication based upon biometric information,
- an automatic inputting unit automatically inputting the predetermined information and/or automatically pressing a button when the personal authentication is valid, said automatic inputting unit comprising:
- an initial position determination unit setting a predetermined position, on the monitor screen, on the input window displayed on the monitor screen;
- a next press position determination unit sequentially moving a next input position using the predetermined position set by the initial position determination unit as reference according to a predetermined rule;
- an input/press unit sequentially and automatically inputting the predetermined information and automatically pressing the button in the two positions determined by the initial position determination unit and/or the next position determination unit;
- an successful/faulty input/press detection unit detecting whether the automatic input and/or the automatic press by the input/press unit has been successful;
- a search area setting unit selling a predetermined search area on the monitor screen when a failure has been detected in the success/faulty input/press detecting unit; and
- a trial unit automatically inputting the predetermined information and/or automatically pressing the button by moving a position of the search area set by the search area setting unit by repeating, when the successful/faulty input/press detection unit detects a failure in the automatic input and/or automatic press performed by the input/press unit on the position determined by the initial position determination unit, the next position determination unit determining the next position, the input/press unit performing the automatic input and/or automatic press on the position, and the successful/faulty input/press detection unit detecting the success/failure of input/press on the automatic input and/or the automatic press; and, when a failure is detected by the detection unit, the next position determination unit determining the next position again, the input/press unit performing the automatic input and/or press on the position, the successful/faulty input/press detection unit detecting the success/failure of the input/press on the automatic input and/or press.

* * * * *

UNITED STATES PATENT AND TRADEMARK OFFICE
CERTIFICATE OF CORRECTION

| | |
|---|---|
| PATENT NO. | : 7,441,181 B2 |
| APPLICATION NO. | : 10/358253 |
| DATED | : October 21, 2008 |
| INVENTOR(S) | : Shigefumi Yamada et al. |

It is certified that error appears in the above-identified patent and that said Letters Patent is hereby corrected as shown below:

On the Title Item -56- (Other Publications), Line 4, change "Scoiety;" to --Society;--.

Column 28, Line 45, change "selling" to --setting--.

Column 40, Line 22, change "selling" to --setting--.

Signed and Sealed this

Sixth Day of January, 2009

JON W. DUDAS
*Director of the United States Patent and Trademark Office*